(12) United States Patent
Shah

(10) Patent No.: US 11,983,732 B2
(45) Date of Patent: *May 14, 2024

(54) SYSTEM AND METHOD FOR DEVELOPING A GROWTH STRATEGY

(71) Applicant: Parthiv Shah, Germantown, MD (US)

(72) Inventor: Parthiv Shah, Germantown, MD (US)

(73) Assignee: Parthiv Shah, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,013

(22) Filed: Nov. 3, 2022

(65) Prior Publication Data
US 2023/0316313 A1  Oct. 5, 2023

Related U.S. Application Data

(63) Continuation of application No. 17/712,567, filed on Apr. 4, 2022, now Pat. No. 11,507,967.

(51) Int. Cl.
*G06Q 10/00* (2023.01)
*G06Q 30/0201* (2023.01)
*G06Q 30/0203* (2023.01)
*G06Q 30/0204* (2023.01)

(52) U.S. Cl.
CPC ..... *G06Q 30/0206* (2013.01); *G06Q 30/0201* (2013.01); *G06Q 30/0203* (2013.01); *G06Q 30/0204* (2013.01)

(58) Field of Classification Search
None
See application file for complete search history.

(56) References Cited

U.S. PATENT DOCUMENTS

| 7,917,383 | B2 | 3/2011 | Maga et al. |
| 8,428,997 | B2 | 4/2013 | Maga et al. |
| 8,504,408 | B2 * | 8/2013 | Banthia ............ G06Q 30/02 705/7.29 |
| 9,886,700 | B1 * | 2/2018 | Allouche ......... G06Q 10/0639 |

(Continued)

OTHER PUBLICATIONS

Frue, Keisha, SWOT Analysis of Artificial Intelligence, May 8, 2019, Pestle Analysis, https://pestleanalysis.com/swot-analysis-of-artificial-intelligence/ , p. 1-13. (Year: 2019).*

*Primary Examiner* — Joseph M Waesco
(74) *Attorney, Agent, or Firm* — Raj S. Dave; Dave Law Group LLC

(57) ABSTRACT

Embodiments relate to a method comprising: analyzing a historical data of an entity over a past period comprising a past transaction and a past revenue to develop a buyer persona of a customer in order to identify ideal prospects; selling a target revenue goal for the entity; generating revenue economics using conversion metrics from the target revenue goal as an input; generating a marketing budget working backward from the revenue economics; and generating a marketing plan for a future period that is based on the marketing budget; wherein the method comprises conducting a Strengths, Weaknesses, Opportunities, and Threats (SWOT) analysis to take an inventory of current situation of the entity and to identify target market segments by generating the opportunities that are in alignment with the strengths of the entity; and wherein the method is for generating a growth master plan for the future period.

20 Claims, 22 Drawing Sheets

(56) References Cited

U.S. PATENT DOCUMENTS

| | | | |
|---|---|---|---|
| 10,346,769 B1* | 7/2019 | Bagepalli | G06Q 10/063 |
| 11,023,831 B2* | 6/2021 | Farooq | G06Q 30/0201 |
| 2002/0042731 A1* | 4/2002 | King, Jr. | G06Q 10/0639 |
| | | | 705/7.29 |
| 2004/0186765 A1 | 9/2004 | Kataoka | |
| 2009/0164306 A1* | 6/2009 | Petrossi | G06Q 30/0206 |
| | | | 705/7.33 |
| 2013/0041749 A1* | 2/2013 | Petrossi | G06Q 10/00 |
| | | | 705/14.42 |
| 2014/0089044 A1* | 3/2014 | Nipko | G06Q 30/0204 |
| | | | 705/7.31 |
| 2016/0012452 A1* | 1/2016 | Unser | G06Q 30/0201 |
| | | | 705/7.29 |
| 2016/0277528 A1* | 9/2016 | Guilaume | G06Q 30/0206 |
| 2019/0220875 A1* | 7/2019 | Fatemi | G06Q 30/0201 |
| 2019/0253515 A1* | 8/2019 | Guilaume | G06Q 30/0201 |
| 2019/0347668 A1* | 11/2019 | Williams | G06N 5/046 |
| 2021/0192412 A1* | 6/2021 | Krishnaswamy | |
| | | | G06Q 10/06375 |
| 2021/0357378 A1* | 11/2021 | Urdiales | G06N 3/08 |

\* cited by examiner

| WHY PEOPLE BUY CANVAS | CLEAR FORM |
|---|---|
| 1. TARGET MARKET | 6. PROBLEM LEVEL 2 |
| CUSTOMER PROFILE | INADEQUATE SOLUTIONS |
| | 7. SOLUTION |
| 1. GOALS | NEW WAY TO SOLVE |
| DEMANDS OF THE CURRENT CUSTOMER | |
| | 8. UNFAIR ADVANTAGE |
| | ADVANTAGE TO THE ENTITY |
| 2. PROBLEMS | |
| EXISTING PROBLEMS | 9. ENTITY POLICY |
| | WHAT THE ENTITY DOES |
| HAS ANYONE IN THE MARKET TRIED TO SOLVE THOSE PROBLEMS | 10. MARKET POSITION |
| | POSITION OF ENTITY IN THE MARKET |
| POTENTIAL THREATS IF THE PROBLEM IS NOT SOLVED | |
| | 11. PAY OFF |
| 3. EMPATHY | END RESULT OF TARGET MARKET |
| OUTLINE OF THE POTENTIAL SOLUTION | |

FIG. 3C

REVENUE ECONOMICS

| | |
|---|---|
| TARGET REVENUE 402-2 | |
| CURRENT REVENUE 402-1 | |
| ATTRITION FACTOR 442 | |
| AVERAGE LIFETIME VALUE OF CUSTOMER 443 | |
| REVENUE GROWTH GOAL | $0000 |
| REALIZABLE LEADS | |

[CLEAR FORM]

| MARKET SEGMENT | PERCENTAGE OF CUSTOMERS | AVERAGE LIFETIME VALUE OF CUSTOMER |
|---|---|---|
| | | |

CONVERSION METRICS

| | 0% | 0% | 0% | 0% | 0% |
|---|---|---|---|---|---|
| REALIZABLE LEADS | QUALIFIED SHOWS | APPOINTMENT SHOW | APPOINTMENTS SET | QUALIFIED LEADS | REQUIRED ACTUAL LEADS |
| | | | | | |

| REALIZED REVENUE GOAL (REALIZABLE LEADS X LIFETIME VALUE OF CUSTOMER) | $0.00 |
|---|---|

| CUSTOMER ACQUISITION COST | | | CUSTOMER VALUE MATRIX | | | |
|---|---|---|---|---|---|---|
| | | | FACTOR | 3x | 5x | 10x |
| VALUE OF ONE REALIZABLE LEADS | $0.00 | | COST REALIZABLE LEADS | $0.00 | $0.00 | $0.00 |
| VALUE OF ONE QUALIFIED SHOWS | $0.00 | | COST OF QUALIFIED SHOWS | $0.00 | $0.00 | $0.00 |
| VALUE OF ONE APPOINTMENT SHOW | $0.00 | | COST OF APPOINTMENT SHOW | $0.00 | $0.00 | $0.00 |
| VALUE OF ONE APPOINTMENT SET | $0.00 | | COST OF APPOINTMENT SET | $0.00 | $0.00 | $0.00 |
| VALUE OF ONE QUALIFIED LEAD | $0.00 | | COST OF QUALIFIED LEAD | $0.00 | $0.00 | $0.00 |
| VALUE OF ONE REQUIRED ACTUAL LEAD | $0.00 | | COST OF REQUIRED ACTUAL LEAD | $0.00 | $0.00 | $0.00 |

FIG. 4C

| CONVERSION METRICS | | | | | |
|---|---|---|---|---|---|
| | 90% | 89% | 70% | 90% | 80% |
| REALIZABLE LEADS | QUALIFIED SHOWS | APPOINTMENT SHOW | APPOINTMENTS SET | QUALIFIED LEADS | REQUIRED ACTUAL LEADS |
| 101 | 112 | 126 | 180 | 200 | 250 |

| REALIZED REVENUE GOAL (REALIZABLE LEADS X LIFETIME VALUE OF CUSTOMER) | $303,000.00 |
|---|---|

| CUSTOMER ACQUISITION COST | |
|---|---|
| VALUE OF ONE REALIZABLE LEADS | $3000.00 |
| VALUE OF ONE QUALIFIED SHOWS | $27000.00 |
| VALUE OF ONE APPOINTMENT SHOW | $2403.00 |
| VALUE OF ONE APPOINTMENT SET | $1682.11 |
| VALUE OF ONE QUALIFIED LEAD | $1513.89 |
| VALUE OF ONE REQUIRED ACTUAL LEAD | $1211.11 |

| CUSTOMER VALUE MATRIX | | | |
|---|---|---|---|
| FACTOR | 3x | 5x | 10x |
| COST REALIZABLE LEADS | $1000.00 | $600.00 | $300.00 |
| COST OF QUALIFIED SHOWS | $900.00 | $550.00 | $270.00 |
| COST OF APPOINTMENT SHOW | $801.00 | $480.60 | $240.30 |
| COST OF APPOINTMENT SET | $560.70 | $336.42 | $168.21 |
| COST OF QUALIFIED LEAD | $504.63 | $302.78 | $151.39 |
| COST OF REQUIRED ACTUAL LEAD | $403.70 | $242.22 | $121.11 |

FIG. 5B

MARKETING IMPLEMENTATION PLAN

12 DAYS, 12 WEEKS, 12 MONTHS, 12 QUARTERS

Included in your fees
- Consult only (no implementation/copy)
- Consult + Implementation (no copy)
- ✓ Consult + Implementation + Copy

| Task | First 12 Days | This Quarter | Next Quarter | Quarter 3 | Quarter 4 | Year 2 | Year 3 | N/A |
|---|---|---|---|---|---|---|---|---|
| Concepts & Strategy, Q.T.O.P. for Q1 | ✓ | | | | | | | |
| Production order and Monday.com | ✓ | | | | | | | |
| Secure Copywriter | ✓ | | | | | | | |
| Secure Technology Deck | ✓ | | | | | | | |
| Data structure & Data Migration plan | ✓ | | | | | | | |
| Corporate Brand Standards (Alice) | | ✓ | | | | | | |
| Personal Brand Standards (Dawn) | | | ✓ | | | | | |
| Brand Voice Document (Russell) | | ✓ | | | | | | |
| Lead Magnet(s) and Free Report(s) | | ✓ | | | | | | |
| Print Assets: Shock & Awe/Wow Box | | | | ✓ | | | | |
| Print Assets: Case Presentation | | | | | ✓ | | | |
| Print Assets: Chair Side Marketing | | | | | | | ✓ | |
| Print Assets: Other (Catalog) | | ✓ | | ✓ | | | | |
| Funnels of eLaunchers | | ✓ | | | | | | |
| Main Sales Letter (Russell) | | ✓ | | | | | | |
| Setup Sales Automation | | | ✓ | | | | | |
| Setup Marketing Automation | | | ✓ | | | | | |
| Offline Traffic: Direct Mail as budgeted | | ✓ | ✓ | ✓ | ✓ | ✓ | ✓ | |
| Online Traffic: SEO/PPC (if budgeted) | | | | | | | ✓ | |
| Other Assets by Russell (As budgeted) | | | ✓ | ✓ | ✓ | ✓ | ✓ | |
| Referral Marketing System | | | | | ✓ | | | |
| Authority Marketing Package (Nina) | | | | | | ✓ | | |
| Content & Blog strategy, Blog CTA | | | | ✓ | | | | |

FIG. 6B

| MARKETING BUDGET BREAKDOWN | | | | | | | | | | | | | |
|---|---|---|---|---|---|---|---|---|---|---|---|---|---|
| MARKETING ACTIVITIES | MONTHLY BUDGET ALLOCATION | | | | | | | | | | | | |
| INTERNAL STAFF COSTS | JAN | FEB | MAR | APR | MAY | JUN | JUL | AUG | SEP | OCT | NOV | DEC | SUB TOTAL |
| SALARIES | | | | | | | | | | | | | $0.00 |
| BENEFITS | | | | | | | | | | | | | $0.00 |
| TAXES | | | | | | | | | | | | | $0.00 |
| TOTAL | $0 | $0 | $0 | $0 | $0 | $0 | $0 | $0 | $0 | $0 | $0 | $0 | $0.00 |
| MARKET RESEARCH | JAN | FEB | MAR | APR | MAY | JUN | JUL | AUG | SEP | OCT | NOV | DEC | SUB TOTAL |
| SURVEY AND RESEARCH | | | | | | | | | | | | | $0.00 |
| DEMOGRAPHICS | | | | | | | | | | | | | $0.00 |
| TOTAL | $0 | $0 | $0 | $0 | $0 | $0 | $0 | $0 | $0 | $0 | $0 | $0 | $0.00 |
| EXTERNAL MARKETING | JAN | FEB | MAR | APR | MAY | JUN | JUL | AUG | SEP | OCT | NOV | DEC | SUB TOTAL |
| ONLINE MARKETING | | | | | | | | | | | | | $0.00 |
| OFFLINE MARKETING | | | | | | | | | | | | | $0.00 |
| PRINT ADVERTISING | | | | | | | | | | | | | $0.00 |
| RADIO/TELEVISION ADVERTISING | | | | | | | | | | | | | $0.00 |
| PUBLIC RELATION EVENTS | | | | | | | | | | | | | $0.00 |
| TOTAL | $0 | $0 | $0 | $0 | $0 | $0 | $0 | $0 | $0 | $0 | $0 | $0 | $0.00 |
| INTERNAL MARKETING | JAN | FEB | MAR | APR | MAY | JUN | JUL | AUG | SEP | OCT | NOV | DEC | SUB TOTAL |
| DIRECT DIGITAL MARKETING | | | | | | | | | | | | | $0.00 |
| IN OFFICE EVENTS AND PROMOTIONS | | | | | | | | | | | | | $0.00 |
| TOTAL | $0 | $0 | $0 | $0 | $0 | $0 | $0 | $0 | $0 | $0 | $0 | $0 | $0.00 |
| OUTSOURCING FEES | JAN | FEB | MAR | APR | MAY | JUN | JUL | AUG | SEP | OCT | NOV | DEC | SUB TOTAL |
| AGENCY FEE | | | | | | | | | | | | | $0.00 |
| COPYWRITING | | | | | | | | | | | | | $0.00 |
| CAMPIAGN FEES | | | | | | | | | | | | | $0.00 |
| TOTAL | $0 | $0 | $0 | $0 | $0 | $0 | $0 | $0 | $0 | $0 | $0 | $0 | $0.00 |
| GRAND TOTAL | $0 | $0 | $0 | $0 | $0 | $0 | $0 | $0 | $0 | $0 | $0 | $0 | $0.00 |

FIG. 7B

| QUARTERLY IMPLEMENTATION PLAN ||||||||||
|---|---|---|---|---|---|---|---|---|---|
| ☐ CONSULT ONLY || ☐ CONSULT + IMPLEMENTATION |||| ☐ CONSULT, COPY AND IMPLEMENTATION ||||
| Q1/2022<br><br>DATE: _____ TO _____ || CONCEPT AND STRATEGY | COPY TO AGENCY | DESIGN | RESEARCH AND DATA PURCHASE | DATA PROCESSING | WEB TECH AND AUTOMATION | PRINTING AND MAILING | PUSH TO NEXT QUARTER |
| MARKETING ACTIVITIES LIST || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |
| || | | | | | | | |

FIG. 8B

| IMPACT FILTER | |
|---|---|
| 1. PROJECT FOCUS: | |
| PURPOSE | SUCCESS CRITERIA |
| WHAT DOES THE ENTITY WANT TO ACCOMPLISH? | SPECIFIC RESULTS FOR THE PROJECT TO BE A SUCCESS |
| WHAT IS THE MOTIVATION FACTOR? | i. |
| | ii. |
| IMPORTANCE | |
| WHAT DIFFERENCE DOES THE PROJECT MAKE TO THE MARKET? | iii. |
| WHAT IS THE IMPACT OF THE PROJECT? | |
| | iv. |
| IDEAL OUTCOME | v. |
| OUTCOME OF THE PROJECT WHAT IS THE PAYOFF? | |
| | vi. |
| MARKETING THE ENTITY: | |
| BEST RESULTS: POSSIBLE OUTCOME IF ACTION IS TAKEN ON THE PROJECT | |
| WORST RESULT: WHAT IS AT STAKE IF NO ACTION IS TAKEN ON THE PROJECT | |

FIG. 8C

| THE STRATEGIC CIRCLE | | | |
|---|---|---|---|
| VISION: GOAL | | VISION: RESULT | |
| START DATE: | END DATE: | | |
| OPPOSITION: | | TRANSFORMATION: | |
| OBSTACLES FACED | | STRATEGIES TO OVERCOME THE OBSTACLES FACED | |
| | ➡ | | |
| | ➡ | | |
| | ➡ | | |
| | ➡ | | |
| | ➡ | | |
| | ➡ | | |
| ACTIONS | | | |
| 1. | 2. | | 3. |

FIG. 8D

| CORE FUNCTIONS OF GROWTH | RANKING PARAMETER | SCORE | WEIGHTED SCORE |
|---|---|---|---|
| BRAND AWARENESS, VISITS, VIEWS | AWARENESS | 1 | 1 |
| LEAD GENERATION | ACQUISITION | 1 | 1 |
| LEAD NURTURE, ENTER SALES PIPELINE | ACTIVATE SALES | 1 | 1 |
| CONVERSION INTO SALES | REVENUE | 1 | 1 |
| CLIENT EXPERIENCE | RETENTION | 1 | 1 |
| RATING, REVIEW, REFERRAL | REFERRAL | 1 | 1 |
|  | TOTAL |  | 10% |

SYSTEM AND METHOD FOR DEVELOPING A GROWTH STRATEGY

CROSS-REFERENCE TO RELATED APPLICATIONS

This application is the continuation of U.S. patent application Ser. No. 17/712,567, filed on Apr. 4, 2022, the entire disclosure of which is incorporated herein by reference as part of the disclosure of this application.

FIELD OF THE INVENTION

This invention relates to a system and method for developing a growth strategy. The invention relates more particularly to a system and method for generation of a marketing concept and strategy to generate a growth master plan for a company.

BACKGROUND

In this section the prior art relevant to the field is cited.

"A business profit improvement Support System, which prompts a user to perform a market analysis evaluation of business and supports profit improvement of the business, comprises an input part for inputting prescribed information, a processing part for calculating a value of a prescribed parameter based on the prescribed information inputted by the input part and determining a ranking of the prescribed parameter based on the value calculated, and a display part for prompting the user to input the prescribed information by the input part, displaying the ranking of the prescribed parameter determined by the processing part in a graph, and prompting the user to perform the market analysis evaluation of the business." [Source: "Business profit improvement support system"; published as U.S patent application number US20040186765A1 on Sep. 23, 2004].

"A method for building an integrated customer analytics solution for an enterprise is provided. The method enables retrieving and processing customer data from data sources available in the enterprise. Further, statistical techniques are generated using the processed data to facilitate analyzing attributes related to the customer. Statistical model outputs are, then, derived using the generated statistical techniques. The statistical model outputs represent metrics corresponding to the analyzed attributes. Furthermore, statistical models are generated corresponding to the statistical model outputs. The statistical models are associated with scores that facilitate to predict likelihood of customer behavior towards products, services and other customer related aspects associated with the enterprise. In addition, reports are generated based on at least one of: the processed data and the one or more statistical model outputs. Finally, the method enables building analytical modules comprising the reports and the statistical models." [Source: "Customer analytics solution for enterprises"; published as US patent number U.S. Pat. No. 8,504,408B2 on Aug. 6, 2013]

"An enhanced business reporting methodology and system architecture provide a way to receive, store, and manipulate customer and revenue data to increase average revenue per user for a business. The system and method analyze a business's current revenue streams and historical revenue trends to identify those revenue streams that may benefit from stimulation, assess the effectiveness of past marketing campaigns, select a revenue stream and strategy to increase the revenue for the selected revenue stream, select a previously successful marketing campaign consistent with the selected strategy. The system and method analyze the customer base to identify characteristics of customers who have responded positively to previous marketing campaigns and whose revenue has increased as a result, in order to create statistical models to identify customers with similar traits and apply the statistical models to score and select customers to contact during future campaigns." [Source: "Customer profitability and value analysis system"; published as US patent number U.S. Pat. No. 8,428,997B2 on Apr. 23, 2013]

"A method and system for operating an enterprise in accordance with an optimized enterprise level business model. A model optimization engine is iteratively processed based on an updated benchmark value and model, until updating the benchmark value involves changing the benchmark value by less than a predetermined benchmark value error threshold to generate the optimized enterprise-level business model. The enterprise is operated in accordance with the optimized enterprise-level business model, including: generating and dynamically displaying real-time performance measures of usage of a computer resource during execution of a business process, determining from the performance measures that the computer resource is a bottleneck, and the computer resource's usage is optimized using the performance measures to reduce data throughput delay and increase throughput of bottleneck operations during execution of the business process. Optimizing the computer resource's usage includes making a computer system work more efficiently and/or use fewer resources." [Source: "Method and system for boosting the average revenue per user of products or services"; published as US patent number U.S. Pat. No. 7,917,383B2 on Mar. 29, 2011]"

"Systems and methods are provided for analyzing a business's profitability. A system for analyzing customer profitability includes an interface for receiving customer, revenue, and cost data from external business operating systems. Customer, revenue, and cost data are stored on a database. A data transformation module operates on the customer data, allocating revenue and costs to individual customers. A customer profitability engine calculates the profitability of customers based on the allocated revenue and cost data. A report module generates reports illustrating the profitability results and other key performance indicators. Optionally, an average customer lifetime value may be calculated based on the customer profitability results. A method for analyzing customer profitability includes identifying sources of revenue, identifying sources of costs, and establishing rules for allocating revenue and costs to individual customers. The method further includes receiving actual customer, revenue and cost data and allocating revenue and costs to individual customers according to the allocation rules. Customer profitability and KPI values are calculated for individual customers and reports are generated illustrating the profitability results and various KPIs for individual customers or groups of customers sharing a common characteristic." [Source: "Optimizing a business model of an enterprise"; published as US patent number U.S. Pat. No. 8,504,408B2 on Aug. 27, 2019]

SUMMARY

An embodiment relates to a method comprising analyzing a historical data by a system of an entity over a past period comprising a past transaction and a past revenue to develop a buyer persona of a customer in order to identify ideal prospects; setting a target revenue goal for the entity through an input device; generating revenue economics by the system using conversion metrics from the target revenue goal as an input; a marketing budget by the system working backward from the revenue economics; and generating a marketing plan by the system for a future period that is based on the marketing budget; wherein the method comprises conducting a Strengths, Weaknesses, Opportunities, and Threats (SWOT) analysis by the system to take an inventory of current situation of the entity and to identify target market segments by generating the opportunities that are in alignment with the strengths of the enclustertity; and wherein the method is for generating a growth master plan for the future period.

In an embodiment of the method, the analyzing of the historical data comprises analyzing a recency of transaction, a frequency of transaction, a monetary value of transaction.

In an embodiment of the method, the historical data of the entity comprises the history of an internal data of the entity and the history of shopping a product by the customer.

In an embodiment of the method, identifying the ideal prospects comprises identifying potential customer segments, identifying potential market segments, identifying a particular product that the customer is interested in purchasing, identifying average quantity of a product that the customer purchases, and identifying capacity of the customer to spend on the product.

In an embodiment of the method, the method further comprises generating a "why people buy canvas" by the system to study and understand the customer.

In an embodiment of the method, the "why people buy canvas" comprises questionnaire comprising, a reason for the customer to make a purchase, problems faced by the customer, an existing solution, the problems in the existing solution, an outline of a potential solution, an unfair advantage to the entity, target market, payoff amount for a target market, a value statement, a goal for the entity, a market position of a product and the entity.

In an embodiment of the method, generating the revenue economics by the system comprises receiving the input comprising a current revenue of the entity, an average lifetime value of the customer, an attrition factor, and the target revenue goal of the entity through the input device to generate an output of realizable leads to reach the target revenue goal.

In an embodiment of the method, the average lifetime value of the customer and the attrition factor of the customer is generated by the system by bifurcating market segments and considering a percentage of customers for the market segments.

In an embodiment of the method, the realizable leads required are used to generate required actual leads using the conversion metrics by the system, wherein the conversion metrics account for various uncertain factors that lead to differences between the realizable leads and the required actual leads.

In an embodiment of the method, the various uncertain factors comprise accounting in percentage of the required actual leads to get to qualified leads, accounting in percentage of qualified leads to get to appointments set, accounting in percentage of appointments set to get to actual shows for the appointments set, accounting in percentage of actual shows to get to qualified shows for the appointments, and accounting in percentage of qualified shows for the appointments to get to the realizable leads.

In an embodiment of the method, a realized revenue is generated by the system by considering the required actual leads generated multiplied by the average lifetime value of the customer.

In an embodiment of the method, a customer acquisition cost is generated based on a factor derived from a capacity of money the entity affords to spend to generate realizable leads considering profit margin and sustainability of a business of the entity.

In an embodiment of the method, the customer acquisition cost is translated to each stage from the realizable leads to required actual leads by the system automatically.

In an embodiment of the method, the stage from the realizable leads to the required actual leads comprises stage to calculate a number of the required actual leads, stage to calculate a number of qualified leads, stage to calculate a number of appointments set, stage to calculate a number of actual shows for the appointment, stage to calculate a number of qualified shows for the appointment, and stage to calculate a number of the realizable leads.

In an embodiment of the method, a customer value matrix is formulated by the system from the customer acquisition cost divided with a factor comprising any value between 1 and 10 for each stage to reach the realizable leads to required actual leads.

In an embodiment of the method, the marketing budget is predicted by the system from the customer value matrix by working backwards from the revenue economics; wherein the marketing budget comprises an amount generated by the customer acquisition cost multiplied by the number of required actual leads divided by the factor comprising any value between 1 and 10.

In an embodiment of the method, generating the marketing plan comprises a plan to execute marketing activities periodically in the future period to reach a realized revenue in a given period.

In an embodiment of the method, generating the marketing plan for the future period comprises generating the marketing activities and a timeline for the marketing activities that assist in realizable leads.

In an embodiment of the method, the marketing activities are outsourced, performed in house or a combination thereof.

In an embodiment of the method, the marketing plan is generated considering factors comprising purpose of the entity, current mission of the entity, core values of the entity, target market for a brand of the entity, position of the brand in a market, brand promise by the entity, the strengths to leverage, the strengths to develop, and sales and marketing economics.

In an embodiment of the method, the marketing plan is divided into a periodic plan; wherein the periodic plan comprises marketing activities to be executed in each period of the marketing plan.

In an embodiment of the method, a questionnaire is used to articulate a project plan; wherein the questionnaire comprises questions related to a strategy to implement the marketing plan, activities to be done by the entity, the reasons to perform a particular activity, important tasks and activities in the project plan and the consequences if that task is not done; and wherein the project plan comprises a roadmap to execute the marketing plan.

In an embodiment of the method, the periodic plan comprises a strategy circle comprising a vision; wherein the vision comprises an expected goal of the periodic plan and an expected result of the quarterly plan.

In an embodiment of the method, the strategy circle further comprises a form to list out the obstacles that are faced as an opposition of the periodic plan, and strategies to transform the obstacles into possible advantages, and a row to list out the possible actions to be taken to get the desired results to achieve a target revenue goal.

In an embodiment of the method, the marketing plan comprises a marketing asset acquisition and a marketing asset management.

In an embodiment of the method, the marketing asset management comprises management of technology infrastructure assets, management of corporate and personal brand assets, management of marketing automation assets, management of customer relationship management system setup and sales automation, management of print assets, management of online presence assets, management of sales copy assets, management of assets for speakers and authors.

In an embodiment of the method, the management of marketing automation assets is done through marketing automation; wherein the marketing automation comprises a failsafe follow up system for any lead communication that covers every scenario of a service transaction.

In an embodiment of the method, the service transaction comprises a series of email sequences and print assets that are delivered via email and via phone and in print sent by the system in order to send message to the right lead at the right time to the lead to convert the lead into a required actual lead.

In an embodiment of the method, marketing automation comprises simple marketing automation and complex marketing automation.

In an embodiment of the method, wherein the simple marketing automation comprises delivering, initial information and help comprising free consultation to generate new leads through email and telephonic communication; nurturing the new leads, by the system, on confirmation of new leads through a long-term nurture system for a long term association; wherein the long-term nurture system comprises a series of emails print and digital material to stay updated about the entity and what it offers sent periodically to keep in touch with the lead; welcoming the new lead by the system, to the entity through a new client welcome system; wherein the new client welcome system comprises print and digital material for the new lead; following up, by the system through emails and telephonic communication, the new lead in case the new lead shows up and there is no sale; wherein the new lead is asked for a reason for no sale and is asked for referral and reviews; and wherein in case here is no show for the appointments set, the client is followed up for not showing up and is asked for referral and reviews; receiving, by the system, reviews and ratings from the new leads.

In an embodiment of the method, the complex marketing automation comprises delivering, initial information and help comprising free consultation to generate new leads through email and telephonic communication; receiving a confirmation of the new lead; passing the new lead through a prospect cycler, by the system, wherein the prospect cycler is a series of marketing messages that go to the new lead who has not been presented with a treatment plan, a proposed product and a service; nurturing the new leads, by the system, on confirmation of new leads for a long term association; wherein the long-term nurture is sent to the new leads passed through the prospect cycler and has not booked an appointment after the initial information provided; welcoming the new lead, by the system, to the entity through a new client welcome system; wherein the new client welcome system comprises print and digital material for the new lead; following up, the new lead in case the new lead shows up and there is no sale; wherein the new lead is asked for a reason for no sale and is asked for referral and reviews; and wherein in case here is no show for the appointments set, the client is followed up for not showing up and is asked for referral and reviews; receiving, by the system, reviews and ratings from the new leads; updating the client in the update cycler; wherein the update cycler comprises series of emails and print assets to keep the new lead updated; tracking, by the system, the impending dates to send a notification to the client; wherein the impending dates comprises birthdays, anniversaries, deadlines, timelines and special days; passing the new lead, by the system, in case the new leads shows up for a sale, through an accepted treatment cycler to educate them on the rules of engagement and the next steps as to what the entity wants them to do as the process to buy the product or service; passing the new lead, by the system, through an unaccepted treatment cycler in case the new lead does not show up to bring the clients back for a follow-up appointment where the lead or client is presented with a clinically sound and fiscally attractive alternative plan.

In an embodiment of the method, the marketing plan further comprises allocation of marketing budget to the marketing activities by generating a marketing budget breakdown.

In an embodiment of the method, the method further comprises generating the marketing budget breakdown comprising allocation of money from the marketing budget to each of the marketing activities according to the marketing plan.

In an embodiment of the method, generating the marketing budget breakdown comprises tracking a part of the marketing budget allocated and an unallocated part of the marketing budget available in cash reserves to spend on discretionary spending to pursue new unplanned opportunities and fund new or unplanned expenses without disrupting the marketing budget.

In an embodiment of the method, the marketing plan is implemented, reviewed, and revised based on a review periodically based on performance.

In an embodiment of the method, the marketing plan is ranked according to an awareness of the marketing plan, acquisition of the market, lead nurturing by providing marketing assets, revenue generated, retention, brand position of the entity, need for improvement in the marketing plan and solution to improve the marketing plan.

In an embodiment of the method, the SWOT analysis comprises an eight-point analysis of the strengths, the weaknesses, the opportunities, the threats, and a combination thereof. An embodiment relates to a system comprising a memory; and a processor coupled with the memory, wherein the processor is operable to analyze a historical data of an entity over a past period comprising a past transaction and a past revenue to develop a buyer persona of a customer in order to identify ideal prospects; set a target revenue goal for the entity; generate revenue economics from the target revenue goal as an input; generate a marketing budget working backward from the revenue economics; and generate a marketing plan for a future period that is based on the marketing budget; wherein the processor is further operable to conduct a Strengths, Weaknesses, Opportunities, and Threats (SWOT) analysis to take an inventory of current situation of the entity and to identify target market segments by generating the opportunities that are in alignment with the strengths of the entity; and wherein the system is for generating a growth master plan for the future period.

In an embodiment of the system, the historical data is analyzed by analyzing a recency of transaction, a frequency of transaction, a monetary value of transaction.

In an embodiment of the system, the historical data of the entity comprises a history of an internal data of the entity and the history of shopping a product by the customer.

In an embodiment of the system, the ideal prospects are identified by identifying potential customer segment, identifying potential market segment, identifying a particular product that the customer is interested in purchasing, identifying average quantity of a product that a customer purchases, and identifying capacity of the customer to spend on the product.

In an embodiment of the system, the processor is further operable to generate a "why people buy canvas" to study and understand the customer.

In an embodiment of the system, the "why people buy canvas" comprises questionnaire comprising, a reason for the customer to make a purchase, problems faced by the customer, an existing solution, glitches in the existing solution, an outline of a potential solution, an unfair advantage to the entity, target market, payoff amount for a target market, a value statement, a goal for the entity, a market position of a product and the entity.

In an embodiment of the system, the processor is further operable to receive the input comprising a current revenue of the entity, an average lifetime value of the customer, an attrition factor, and the target revenue goal of the entity to generate an output of realizable leads to reach the target revenue goal to generate the revenue economics.

In an embodiment of the system, the average lifetime value of the customer and the attrition factor of the customer is generated by bifurcating market segments and considering a percentage of customers for the market segments.

In an embodiment of the system, the realizable leads required are used to generate required actual leads using the conversion metrics, wherein the conversion metrics account for various uncertain factors that lead to differences between the realizable leads and the required actual leads.

In an embodiment of the system, the various uncertain factors comprise accounting in percentage of the required actual leads to get to qualified leads, accounting in percentage of qualified leads to get to appointments set, accounting in percentage of the appointments set to get to actual shows for the appointment, accounting in percentage of actual shows to get to qualified shows for the appointment, and accounting in percentage of qualified shows for the appointments set to get to the realizable leads.

In an embodiment of the system, a realized revenue is generated automatically by considering the required actual leads generated multiplied by the average lifetime value of the customer.

In an embodiment of the system, a customer acquisition cost is generated based on a factor derived from a capacity of money the entity affords to spend to generate realizable leads considering profit margin and sustainability of a business of the entity.

In an embodiment of the system, the customer acquisition cost is translated automatically to each stage from the realizable leads to the required actual leads.

In an embodiment of the system, the stage from the realizable leads to the required actual leads comprises stage to calculate a number of the required actual leads, stage to calculate a number of qualified leads, stage to calculate a number of appointments set, stage to calculate a number of actual shows for an appointment, stage to calculate a number of qualified shows for an appointment, and stage to calculate a number of the realizable leads.

In an embodiment of the system, a customer value matrix is formulated from the customer acquisition cost divided with a factor comprising any value between 1 and 10 for each stage to reach the realizable leads to required actual leads.

In an embodiment of the system, the marketing budget is predicted automatically from the customer value matrix by working backwards from the revenue economics; wherein the marketing budget comprises an amount generated by the customer acquisition cost multiplied by the number of required actual leads divided by the factor comprising any value between 1 and 10.

In an embodiment of the system, the marketing plan comprises a plan to execute marketing activities periodically in the future period to reach the realized revenue in a given period.

In an embodiment of the system, the marketing plan for the future period comprises generating the marketing activities and a timeline for the marketing activities that assist in realizable leads.

In an embodiment of the system, the marketing activities are outsourced, performed in house or a combination thereof.

In an embodiment of the system, the marketing plan is generated considering factors comprising purpose of the entity, current mission of the entity, core values of the entity, target market for a brand of the entity, position of the brand in a market, brand promise by the entity, the strengths to leverage, the strengths to develop, and sales and marketing economics.

In an embodiment of the system, the marketing plan comprises a marketing asset acquisition and a marketing asset management.

In an embodiment of the system, the marketing asset management comprises management of technology infrastructure assets, management of corporate and personal brand assets, management of marketing automation assets, management of customer relationship management system setup and sales automation, management of print assets, management of online presence assets, management of sales copy assets, management of assets for speakers and authors.

In an embodiment of the system, the marketing plan further comprises allocation of the marketing budget to the marketing activities.

In an embodiment of the system, the processor is further operable to generate a marketing budget breakdown comprising allocation of money from the budget to each of the marketing activities according to the marketing plan.

In an embodiment of the system, the processor is further operable to track a part of the marketing budget allocated and an unallocated part of the marketing budget available in cash reserves to spend on discretionary spending to pursue new unplanned opportunities and fund new or unplanned expenses without disrupting the budget.

In an embodiment of the system, the marketing plan is implemented, reviewed, and revised based on a review periodically based on performance.

In an embodiment of the system, the marketing plan is ranked according to an awareness of the marketing plan, acquisition of the market, lead nurturing by providing marketing assets, revenue generated, retention, brand position of the entity, need for improvement in the marketing plan and solution to improve the marketing plan.

In an embodiment of the system, the SWOT analysis comprises an eight-point analysis of the strengths, the weaknesses, the opportunities, the threats, and a combination thereof. An embodiment relates to a non-transitory computer storage medium storing a sequence of instructions, which when executed by a processor, causes analyzing a historical data of an entity over a past period comprising a past transaction and a past revenue to develop a buyer persona of an ideal customer in order to identify ideal prospects; setting a target revenue goal for the entity; generating revenue economics from the target revenue goal as an input; generating a marketing budget working backward from the revenue economics; and generating a marketing plan for a future period that is based on the marketing budget; wherein a computer program comprises conducting a Strengths, Weaknesses, Opportunities, and Threats (SWOT) analysis to take an inventory of current situation of the entity and to identify target market segments by generating opportunities that are in alignment with the strengths of the entity; and wherein the computer program is for generating a growth master plan for the future period.

In an embodiment it is a method, comprising the steps of: extracting, by a system, data comprising historical data, revenue data and customer data from one or more data sources over a past period; accessing, by the system, the data in the data sources to build a diagnostic tree automatically and providing an analysis of revenue of an entity based on individual revenue streams, each revenue stream corresponding to a sale or use of various products or services offered by the entity, wherein the diagnostic tree is further configured for generating average revenue per customer of the products or services corresponding to each revenue stream; processing the customer data and the revenue data from the one or more data sources and extracting an ideal customer profile (ICP) personifying an ideal customer, the ICP comprising a plurality of ICP business attribute fields and a plurality of ICP persona attribute fields comprising customer characteristics, wherein processing the customer data is based on business specifications and requirement analysis of the entity; analyzing the customer data using one or more codes to generate one or more statistical techniques comprising at least one of descriptive statistics, cluster analysis, forecasting, survival analysis and logit model, wherein the one or more codes are developed using a statistical package module configured for analyzing one or more attributes related to the customer; identifying, by the system executing a data mining module, target market segments and a target list of customers; receiving an input in real-time, by the system, comprising a current revenue of the entity, an average lifetime value of the customer, an attrition factor, and a target revenue goal of the entity through an input device and generating realizable leads to reach the target revenue goal; generating automatically, by the system, required actual leads from one or more lead data sources, wherein each required actual lead is matched and compared to the ICP based on a match rate signal, and wherein the match rate signal is calculated based on a plurality of attributes of each of the required actual leads matching the ICP business and ICP persona attribute fields; estimating automatically, a marketing budget, by the system, working backward from the target revenue goal wherein the marketing budget is predicted by the system from a customer value matrix, wherein the customer value matrix is a customer acquisition cost to reach the realizable leads to the required actual leads; and automatically creating a marketing plan comprising marketing activities and a timeline for the marketing activities, by the system, for a future period that is based on the marketing budget; wherein the method comprises conducting a Strengths, Weaknesses, Opportunities, and Threats (SWOT) analysis by the system to take an inventory of current situation of the entity and to identify the target market segments that are in alignment with the strengths of the entity; and wherein the method is for generating automatically, a growth master plan for the future period.

In an embodiment of a method, the historical data comprises at least one of a recency of transaction, a frequency of transaction, and a monetary value of transaction.

In an embodiment of a method, the method further comprises identifying a potential customer segment, identifying a potential market segment, identifying a particular product that the customer is interested in purchasing, identifying average quantity of a product purchased, and identifying capacity of the customer to spend on the product.

In an embodiment of a method, the method further comprises generating a why people buy canvas by the system to study and understand the customer; and wherein the why people buy canvas comprises questionnaire comprising, a reason for the customer to make a purchase, problems faced by the customer, an existing solution, the problems in the existing solution, an outline of a potential solution, an unfair advantage to the entity, target market, payoff amount for a target market, a value statement, a goal for the entity, a market position of a product and the entity.

In an embodiment of a method, the diagnostic tree is an interactive diagnostic tree.

In an embodiment of a method, the average lifetime value of the customer and the attrition factor of the customer is generated by the system by bifurcating market segments and considering a percentage of customers for the market segments.

In an embodiment of a method, the realizable leads are used to generate required actual leads using a conversion metrics by the system, wherein the conversion metrics accounts for various uncertain factors that lead to differences between the realizable leads and the required actual leads.

In an embodiment of a method, the various uncertain factors are accounted in percentage; and wherein the various uncertain factors comprise the required actual leads to get to qualified leads, the qualified leads to get to appointments set, the appointments set to get to leads showing up for the appointments set, the actual shows to get to qualified shows for the appointments set, and the qualified shows for the appointments set to get to the realizable leads.

In an embodiment of a method, a realized revenue is generated by the system by considering required actual leads generated multiplied by the average lifetime value of the customer.

In an embodiment of a method, a customer acquisition cost is generated based on a first factor derived from a capacity of money the entity affords to spend on the realizable leads considering profit margin and sustainability of a business of the entity; and wherein the customer acquisition cost is translated to a first stage from the realizable leads to required actual leads by the system; and wherein the first stage from the realizable leads to the required actual leads comprises a second stage to calculate the required actual leads, a third stage to calculate qualified leads, a fourth stage to calculate appointments set, a fifth stage to calculate actual shows for the appointments set, a sixth stage to calculate qualified shows for the appointments set, and a seventh stage to calculate the realizable leads.

In an embodiment of a method, the customer value matrix is formulated by the system from the customer acquisition cost divided with a second factor comprising a value for an eight stage to reach the realizable leads to the required actual leads.

In an embodiment of a method, the marketing budget is predicted by the system from the customer value matrix by working backwards from revenue economics; and wherein the marketing budget is a function of the customer acquisition cost and the required actual leads.

In an embodiment of a method, the marketing activities are outsourced or performed in house or a combination thereof.

In an embodiment of a method, the marketing plan is generated considering factors comprising, purpose of the entity, current mission of the entity, core values of the entity, target market segments for a brand of the entity, position of the brand in a market, brand promise by the entity, the strengths to leverage, the strengths to develop, and sales and marketing economics.

In an embodiment of a method, the marketing plan is divided into a periodic plan; and wherein the periodic plan comprises the marketing activities to be executed in a period of the marketing plan; and wherein the periodic plan comprises a strategy circle comprising a vision; and wherein the vision comprises an expected goal of the periodic plan and an expected result of the periodic plan.

In an embodiment of a method, the method further comprises generating the marketing budget from the customer value matrix and further generating breakdown of the marketing budget comprises allocation of money from the marketing budget to marketing activities according to the marketing plan.

In an embodiment of a method, generating the breakdown of the marketing budget comprises tracking a part of the marketing budget allocated and an unallocated part of the marketing budget available in cash reserves to spend on discretionary spending to pursue new unplanned opportunities and fund new and unplanned expenses.

In an embodiment of a method, implementing, reviewing, and revising of the marketing plan is based on a periodical review based on performance; and wherein the marketing plan is ranked according to an awareness of the marketing plan, acquisition of the market, lead nurturing by providing marketing assets, revenue generated, retention, brand position of the entity, need for improvement in the marketing plan and solution to improve the marketing plan.

In an embodiment of a method, the SWOT analysis comprises an eight-point analysis of the strengths, the weaknesses, the opportunities, the threats, and a combination thereof.

An embodiment relates to a system comprising a memory, and a processor coupled with the memory, wherein the processor is operable to extracting, by the system, data comprising historical data, revenue data and customer data from one or more data sources over a past period; accessing, by the system, the data in the data sources to build a diagnostic tree automatically and providing an analysis of revenue of an entity based on individual revenue streams, each revenue stream corresponding to a sale or use of various products or services offered by the entity, wherein the diagnostic tree is further configured for generating average revenue per customer of the products or services corresponding to each revenue stream; processing the customer data and the revenue data from the one or more data sources and extracting an ideal customer profile (ICP) personifying an ideal customer, the ICP comprising a plurality of ICP business attribute fields and a plurality of ICP persona attribute fields comprising customer characteristics, wherein processing the customer data is based on business specifications and requirement analysis of the entity; analyzing the customer data using one or more codes to generate one or more statistical techniques comprising at least one of descriptive statistics, cluster analysis, forecasting, survival analysis and logit model, wherein the one or more codes are developed using a statistical package module configured for analyzing one or more attributes related to the customer; identifying, by the system executing a data mining module, target market segments and a target list of customers; receiving an input in real-time, by the system, comprising a current revenue of the entity, an average lifetime value of the customer, an attrition factor, and a target revenue goal of the entity through an input device and generating realizable leads to reach the target revenue goal; generating automatically, by the system, required actual leads from one or more lead data sources, wherein each required actual lead is matched and compared to the ICP based on a match rate signal, and wherein the match rate signal is calculated based on a plurality of attributes of each of the required actual leads matching the ICP business and ICP persona attribute fields; estimating automatically, a marketing budget, by the system, working backward from the target revenue goal wherein the marketing budget is predicted by the system from a customer value matrix, wherein the customer value matrix is a customer acquisition cost to reach the realizable leads to the required actual leads; and automatically creating a marketing plan comprising marketing activities and a timeline for the marketing activities, by the system, for a future period that is based on the marketing budget; conducting, by the system, a Strengths, Weaknesses, Opportunities, and Threats (SWOT) analysis by the system to take an inventory of current situation of the entity and to identify the target market segments that are in alignment with the strengths of the entity; and wherein the system is for generating automatically, a growth master plan for the future period.

An embodiment relates to a non-transitory computer storage medium storing a sequence of instructions, which when executed by a processor, causes, extracting, by a system, data comprising historical data, revenue data and customer data from one or more data sources over a past period; accessing, by the system, the data in the data sources to build a diagnostic tree automatically and providing an analysis of revenue of an entity based on individual revenue streams, each revenue stream corresponding to a sale or use of various products or services offered by the entity, wherein the diagnostic tree is further configured for generating average revenue per customer of the products or services corresponding to each revenue stream; processing the customer data and the revenue data from the one or more data sources and extracting an ideal customer profile (ICP) personifying an ideal customer, the ICP comprising a plurality of ICP business attribute fields and a plurality of ICP persona attribute fields comprising customer characteristics, wherein processing the customer data is based on business specifications and requirement analysis of the entity; analyzing the customer data using one or more codes to generate one or more statistical techniques comprising at least one of descriptive statistics, cluster analysis, forecasting, survival analysis and logit model, wherein the one or more codes are developed using a statistical package module configured for analyzing one or more attributes related to the customer; identifying, by the system executing a data mining module, target market segments and a target list of customers; receiving an input in real-time, by the system, comprising a current revenue of the entity, an average lifetime value of the customer, an attrition factor, and a target revenue goal of the entity through an input device and generating realizable leads to reach the target revenue goal; generating automatically, by the system, required actual leads from one or more lead data sources, wherein each required actual lead is matched and compared to the ICP based on a match rate signal, and wherein the match rate signal is calculated based on a plurality of attributes of each of the required actual leads matching the ICP business and ICP persona attribute fields; estimating automatically, a marketing budget, by the system, working backward from the target revenue goal wherein the marketing budget is predicted by the system from a customer value matrix, wherein the customer value matrix is a customer acquisition cost to reach the realizable leads to the required actual leads; and automatically creating a marketing plan comprising marketing activities and a timeline for the marketing activities, by the system, for a future period that is based on the marketing budget; conducting, by the system, a Strengths, Weaknesses, Opportunities, and Threats (SWOT) analysis by the system to take an inventory of current situation of the entity and to identify the target market segments that are in alignment with the strengths of the entity; and wherein the sequence of instructions are configured for generating automatically, a growth master plan for the future period.

BRIEF DESCRIPTION OF THE FIGURES

FIG. 3C illustrates an example of the form for the "why people buy canvas displayed on the output interface of the system according to an embodiment of the invention.

FIG. 4C illustrates an example of revenue economics generation through the system for developing a growth strategy according to an embodiment of the invention.

FIG. 5B illustrates an example of the required actual leads for realizable leads to reach the target revenue goal according to an embodiment of the invention.

FIG. 6B shows an illustration of the form of the marketing plan generated by the system.

FIG. 7B shows an example of a form displayed on the output interface of the system to generate a marketing budget breakdown according to each of the marketing activities, according to an embodiment of the invention.

FIG. 8B shows an example of the quarterly plan according to an embodiment of the invention.

FIG. 8C shows an example of the impact filter of the quarterly plan, according to an embodiment of the invention.

FIG. 8D shows an example of a form for the strategy circle according to an embodiment of the invention.

DETAILED DESCRIPTION

Definitions and General Techniques

Figure 1:
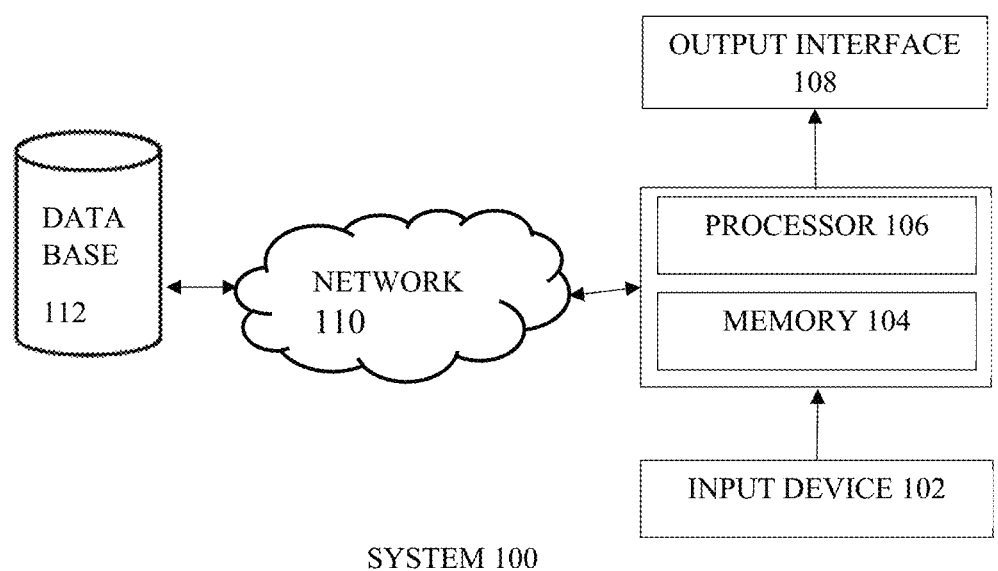
FIG. 1 shows a generic block level diagram of a system for developing a growth strategy according to an embodiment of the invention.

In order to fully understand the scope of the invention, the following terms used herein are hereby defined.

For simplicity and clarity of illustration, the drawing figures illustrate the general manner of construction. Descriptions and details of well-known features and techniques may be omitted to avoid unnecessarily obscuring the present disclosure. The dimensions of some of the elements in the figures may be exaggerated relative to other elements to help improve understanding of embodiments of the present disclosure. Different reference numerals corresponding to the same element in different figures denote the same elements.

The articles "a" and "an" used herein refer to one or to more than one (i.e., to at least one) of the grammatical object of the article. By way of example, "an element" means one element or more than one element.

No element, act, or instruction used herein should be construed as critical or essential unless explicitly described as such. Furthermore, as used herein, the term "set" is intended to include items (e.g., related items, unrelated items, a combination of related items, a combination of related and unrelated items, and a combination of unrelated items, etc.), and may be used interchangeably with "one or more". Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The terms "first", "second", "third" and the like in the description and in the claims, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include", "have", and any variations thereof, are intended to cover a non-exclusive inclusion, such that a process, method, system, article, device, or apparatus that comprises a list of elements is not necessarily limited to those elements and may include other elements not expressly listed or inherent to such process, method, system, article, device, or apparatus.

The terms "left", "right", "front", "back", "top", "bottom", "over", "under" and the like in the description and in the claims are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The term "comprising", which is synonymous with "including", "containing", or "characterized by" used herein refers to being inclusive or open-ended, and does not exclude additional, unrecited elements or method steps, unless the context clearly requires otherwise.

As used herein, the term "component" is intended to be broadly construed as hardware, firmware, and/or a combination of hardware and software.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in several ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

As used herein "Machine learning" refers to algorithms that give a computer the ability to learn without being explicitly programmed, including algorithms that learn from and make predictions about data. Machine learning algorithms include, and are not limited to, decision tree learning, artificial neural networks (ANN) (also referred to herein as a "neural net"), deep learning neural network, support vector machines, rules-based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming.

As used herein, the term "Dashboard" is a type of interface that visualizes particular Key Performance Indicators (KPIs) for a specific goal or process. It is based on data visualization and infographics.

As used herein, a "Database" is a collection of information that is organized so that it can be easily accessed, managed, and updated. Computer databases typically contain aggregations of data records or files.

As used herein, the term "Cloud" refers to servers that are accessed over the Internet, and the software and databases that run on those servers. Cloud servers are located in data centers all over the world. By using cloud computing, users and companies don't have to manage physical servers themselves or run software applications on their own machines.

Implementations may be realized in a computing system that includes a back-end component, e.g., as a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), e.g., the Intranet and Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such mass storage devices. Moreover, a computer may be embedded in another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device (e.g., a CRT (cathode ray tube) or LCD (liquid crystal display) monitor) for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The term "device" as used herein refers to an electronic element that cannot be divided without destroying its stated function.

The term "communicatively coupled" as used herein refers to devices connected in a way that permits communication.

The term "configured" as used herein refers to arranged within the system to perform certain functions.

The term "receiving" as used herein refers to being given information.

The term "generating" as used herein refers to creating information.

The term "memory" as used herein refers to any device in which information can be stored.

The term "executes" as used herein refers to run or launch.

The term "instructions" as used herein refers to a software program or machine executable code.

The term "processor" as used herein refers to a component in the server for executing instructions stored in memory.

The term "historical data" as used herein refers to data about past events and circumstances pertaining to a particular subject. Historical data includes most data generated either manually or automatically of an entity. Sources, among a great number of possibilities, include press releases, log files, financial reports, financial transactions, product related data, product sales, purchase data, project and product documentation and email and other communications.

The term "entity" as used herein refers to an organization, institution, establishment, or company that is privately owned, public or in combination.

The term "past period" as used herein refers to a time period of the past. For example, past period may be past one year, past two years, past five years etc., from the current year.

The term "future period" as used herein refers to a future time period. For example, the future period may be the next one year, the next two years, the next five years etc., from the current year.

The term "buyer persona or Ideal customer profile (ICP)" as used herein refers to a fictional representation of your ideal customer or target audience. Buyer persona may refer to ideal buyer's goals and challenges. The buyer persona may include what a buyer purchases, what a buyer is interested to purchase, and capacity of the buyer to purchase. It is used to provide a clear picture of who the company is marketing to and is much easier to develop effective, targeted products that speaks to your ideal buyer's goals and challenges.

The term "transaction" as used herein refers to an exchange or transfer of goods, services, or funds. A transaction may also refer to a completed agreement between a buyer and a seller to exchange goods, services, or financial assets in return for money.

The term "ideal prospects" as used herein refers to someone who gets their exact needs met by the product or service offered by the entity. An ideal prospect also may be referred to as the type of customer that an entity focuses its resources on within a specific timeframe.

The term "target revenue goal" as used herein refers to a target amount of revenue set by an entity to achieve in a specific given timeline.

The term "revenue economics" as used herein refers to a target revenue goal and the number of realizable leads calculated to achieve the target revenue goals.

The term "revenue streams" as used herein refers to various sources from which a business earns money from the sale of goods or the provision of services. A single source of revenue a business generates is called a revenue stream or individual revenue stream.

The term "average revenue per customer" as used herein refers to the amount of money that a company can expect to generate from an individual customer. In an embodiment, a diagnostic tree may provide an analysis of the enterprise's/business's revenue based on individual revenue streams.

The term "diagnostic tree" as used herein refers to a tool or process that allows the analyst to break the diagnostic process into a number of well-defined stages on the understanding that the option selected at each branch point of a diagnostic tree provides guidance regarding the range of issues to be considered at the next stage. It provides a way of moving from one branch point to another in a manner that leads toward a clearcut outcome regarding the preferred response.

The term "Profile" or "Customer Profile" as used herein comprises attribute fields to describe a business client or a set of business clients, and includes two parts: company, and persona. Exemplary company attributes include, but are not limited to, industry, revenue, number of employees, brands, and growth. Exemplary persona attributes are as described above, and may include, for example, age, gender, title, and education level.

The term "Ideal Customer Profile" (ICP) as used herein refers to a lead profile or customer profile defining, describing, quantifying, or personifying core, ideal customers that drive the most revenue. An ICP may be used to benchmark existing leads, or as a template for generating new leads. An ICP may contain two aspects, company, and persona, where each may be specified by one or more attribute or property fields. A company profile characterizes a client organization of interest. A persona profile characterizes the client in terms of one or more roles within the client organization for targeted marketing campaigns. An ICP may comprise attributes correlated with high probability of successfully closing and winning high-value deals, in terms of metrics, scores or weightings as defined or disclosed herein. An ICP is a "template" for ideal customers, based on various parameters that are described by attribute fields. Some examples of attribute fields describing ICPs are illustrated in FIG. 7. For example, the attribute fields of "seniority=Executive" and "age <=35" in an ICP would indicate that the persona of an ideal customer is an executive-level individual with an age of less than or equal to 35. In an example, it can be one or more of age, gender, ethnicity, income, level of education, religion, profession/role in a company etc. These attribute fields are used to match potential leads to the ICP, based on a match rate signal.

The term "Match rate" or "Match rate signal" as used herein refers to a score or measure of the similarity of a lead to a given profile such as an ICP. Leads with high match rates may be considered as "matching" the ICP. In one example, a match rate may be computed as a percentage of the number of attributes in a lead that matches those for a given ICP; in another example, a match rate may be computed as a weighted combination of degrees of similarities between lead attributes and ICP attributes. Other examples of match-rate signals include percentage of attributes of a customer lead meeting the attribute fields of the ICP, number of attributes of a customer lead meeting the attribute fields of the ICP, a weighted average of attributes of a customer lead meeting the attribute fields of the ICP, and so on.

The term "lead data source" as used herein means any lead data source that is selected from the group comprising a system database, one or more third-party databases, and the one or more channel advertising partners. Exemplary third-party databases that may serve as lead data sources and enrichment data sources include, but are not limited to, platforms such as Zoom®, Microsoft® Teams®. In an example, third-party databases include third-party advertising partners, for example, advertising platforms such as Facebook®, Twitter®, and LinkedIn® may be used to find and enrich candidate leads as well. Candidate lead generated may be stored locally in a target audience database.

The term "data source" as used herein refers to a location where data that is being used comes from. Data sources can change based on the target analysis that is being performed. For example, when a lead is to be identified, data sources can be referred to as lead data sources. When a revenue stream is to be identified, then the data source could be a revenue database. Some example data sources could be in-store and online sales data, web browsing data, survey data, customer service data, sales department data, advertising platforms, web analytics, marketing automation platforms, loyalty data, mobile app data, legacy data, wearables and the internet of things data etc.

The term "conversion metrics" as used herein refers to the metrics used to convert one parameter into another. The conversion metrics account for various uncertain factors to convert one parameter into another parameter such as for example percentage drop of customers from booking an appointment to show of appointment.

The term "marketing budget" as used herein refers to an estimate of projected costs to market the products or services. A typical marketing budget will consider all marketing costs e.g., marketing communications, salaries for marketing managers, cost of office space, management of marketing activities and management of marketing costs, etc.

The term "marketing plan" as used herein refers to a strategy that an entity will use to market its products to customers. The plan identifies the target market, the value proposition of the brand or the product, the campaigns to be initiated, and the metrics to be used to assess the effectiveness of marketing initiatives and marketing activities.

The term "marketing concept" as defined herein refers to a marketing plan based on the use of marketing data to focus on the needs and wants of customers in order to develop marketing strategies that not only satisfy the needs of the customers but also accomplish the goals of the organization.

The term "growth master plan" as defined herein refers to a complete plan comprising analyses of historical data, generation of revenue economics, generation of a marketing budget and a marketing plan and implementation and management of the marketing plan as well as the marketing assets. The growth master plan also includes ranking, reviewing, and revising of the marketing plan. Growth master plan is a collection of documents that comprises a growth chart, a success blueprint for growth, a strategy system, and a Q.T.O.P. Quarterly Tactical Operations Plan.

The term "SWOT analysis" as used herein refers to a study undertaken by an organization to identify its internal strengths and weaknesses, as well as its external opportunities and threats. SWOT analysis provides a framework used to evaluate a company's competitive position and to develop strategic planning. SWOT analysis assesses internal and external factors, as well as current and future potential.

The term "market segment" as used herein refers to people who are grouped together for marketing purposes. Market segments are part of a larger market, often lumping individuals together based on one or more similar characteristics. Corporations and their marketing teams use various criteria to develop a target market for their products and services. Marketing professionals approach each segment differently, but only after full understanding of the needs, lifestyles, demographics, and personality of the target consumer.

The term "why people buy canvas" as used herein refers to a mapping of the problems faced by the customer, existing solutions, loopholes in the solutions and the solutions that the entity is going to provide according to the mapping of problems. While generating the "why people buy canvas", the unfair advantage to the entity, target market, payoff amount for a target market, a value statement, a goal for the entity, a market position of a product and the entity are also taken into consideration.

The term "market segmentation" as used herein refers to splitting potential customers into meaningful groups based on their characteristics, wants, and behaviors. In general, market segmentation is the act of dividing a large target market into distinct groups of consumers who have similar characteristics, needs or behaviors to identify more approachable and target groups.

The term "unfair advantage" as used herein refers to a degree of certainty for eliminating competition; this is predominantly used in a business environment, however, and can also be applied in other ways too. The main point to consider regarding an unfair competitive advantage is that the same opportunities are not available to everyone unless the possessor of the unfair competitive advantage decides to grant permission for people to share the opportunity.

The term "payoff amount" as used herein refers to the amount one actually has to pay to satisfy the terms of one's mortgage loan and completely pay off one's debt.

The term "value statement" as used herein refers to a list of core principles that guide and direct the organization and its culture. In a values-led organization, the values create a moral compass for the organization and its employees. It guides decision-making and establishes a standard against which actions can be assessed.

The term "market position" as used herein refers to a consumer's perception of a brand or product in relation to competing brands or products. Market positioning refers to the process of establishing the image or identity of a brand or product so that consumers perceive it in a certain way.

The term "current revenue" as used herein refers to the amount of money the company earns from sales over a year; it does not include costs and expenses.

The term "average lifetime value of a customer" as used herein refers to a measure of the total income a business can expect to bring in from a typical customer for as long as that person or account remains a client. When measuring the lifetime value of a customer, the total average revenue generated by a customer and the total average profit is taken into consideration. Each provides important insights into how customers interact with a business, and if the overall marketing plan is working as expected.

The term "attrition factor" as used herein refers to a loss of customers by a business. Most customers of a given business will not remain active customers indefinitely. Whether a one-time purchaser or a loyal customer over many years, every customer will eventually cease his or her relationship with the business. The customer attrition factor is measured for a given period by dividing the number of customers the company had at the beginning of the period by the number of customers at the end of the period.

The term "leads generation" and "number of leads generated" as used herein refers to the process of attracting prospects and converting them into someone who has an interest in the entity's products and services.

The term "realizable leads" as used herein refers to a number of new leads or new ideal customers required to reach the targeted amount of revenue growth in an entity.

The term "required actual leads" as used herein refers to a number of new leads or new ideal customers that are actually required considering a percentage of drop of customers at each stage from booking an appointment to the actual show of the appointment, so that the final outcome of the customers is the number of realizable leads.

The term "qualified leads" as used herein refers to a potential customer in the future, based on certain fixed criteria of the entity's requirements. The potential customer may be a new customer or an already existing customer.

The term "appointments set" as used herein refers to a number of customers that agree or confirm to show up to make a purchase from the qualified leads.

The term "actual shows for an appointment" as used herein refers to a number of appointments set that make an actual visit to the entity either online or physically present to purchase the product or service.

The term "qualified shows for an appointment" as used herein refers to a number of appointments that make an actual visit to the entity either online or physically present to purchase the product or service and actually purchase the product and service.

The term "customer acquisition cost" as used herein refers to a cost related to acquiring a new customer. In other words, customer acquisition cost refers to the resources and costs incurred to acquire a customer. Customer acquisition cost is a key business metric that is commonly used alongside the customer lifetime value (LTV) metric to measure value generated by a new customer. The customer acquisition cost may be used to measure the value generated by the required actual leads.

The term "profit margin" as used herein refers to a measure of a company's earnings (or profits) relative to its revenue. The three main profit margin metrics are gross profit margin (total revenue minus cost of goods sold (COGS), operating profit margin (revenue minus COGS and operating expenses), and net profit margin (revenue minus all expenses, including interest and taxes)).

The term "sustainability of the business" as used herein refers to a business approach to creating long-term value by taking into consideration how a given organization operates in the ecological, social, and economic environment. Sustainability is built on the assumption that developing such strategies foster company longevity.

The term "customer value matrix" as used herein refers to a matrix showing the value to acquire a customer at different stages, from confirmation of the lead to confirmed show for the appointment.

The term "realized revenue" as used herein refers to the value of revenue generated by an average lifetime value of a customer multiplied by the number of realizable leads required.

The term "marketing activities" as used herein refers to a significant factor that determines the success of a business. The things an individual or organization undertakes to boost sales and improve its brand. Marketing activities are the processes for creating effective communication, exchanging, and delivering offerings that increase the interest to purchase.

The term "marketing asset" as used herein refers to any items that an entity uses to educate people about and promote its products, services, or brand. These assets can be physical, like brochures, or digital, such as web content. A company's mission, marketing strategy and target audience help determine what assets are most effective.

The term "marketing asset management" as used herein refers to a platform that gives marketing teams full control over their assets. It helps organize valuable digital content and other files, ensuring the assets are available for easy use and re-use. This helps reduce the time wasted on trying to dig out assets or their source files.

The term "marketing budget" as used herein refers to an amount of funding designated to each expenditure line that is the marketing activity. It designates the maximum amount of funding an organization is willing to spend on a given item or program or a marketing activity, and it is a limit that is not to be exceeded by the employee authorized to charge expenses to a particular budget line. Marketing budget breakdown is further allocating the marketing budget to marketing tasks.

The term "ranking the marketing plan" as used herein refers to a rating given to a marketing plan based upon the performance of the marketing plan according to some preset parameters such as awareness, retention, revenue generated, etc.

Example embodiments, as described below, may be used to provide a system for developing a growth strategy. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

Implementations and all of the functional operations described in this specification may be realized in digital electronic circuitry, or in computer software, firmware, or hardware.

A software program (also known as a program, software, executable code, or instructions) may be written in any appropriate form of programming language, including compiled or interpreted languages, and it may be deployed in any appropriate form, including as a standalone program or as a module, component, subroutine, or other unit suitable for use in a computing environment.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments. Foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, and units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

An embodiment discloses a system comprising: a memory; and a processor coupled or communicatively coupled with the memory. The processor is operable to; analyze a historical data of an entity over a past period comprising a past transaction and a past revenue to develop a buyer persona of a customer in order to identify ideal prospects; set a target revenue goal for the entity; generate revenue economics from the target revenue goal as an input; generate a marketing budget working backward from the revenue economics; generate a marketing plan for a future period that is based on the marketing budget. The processor is further operable to conduct a Strengths, Weaknesses, Opportunities, and Threats (SWOT) analysis to take an inventory of current situation of the entity and to identify target market segments, by generating the opportunities that are in alignment with the strengths of the entity and the system, for generating the marketing plan for the future period that is based on the marketing budget.

In an embodiment, gradient boosted machines (GBMs), which are high-performing predictive models, are used for behavioral predictions about customers. In an embodiment, it can find the prospects most resembling current, high-value customers, it can identify customers that are likely to upgrade to a higher service level, it can identify customers that are likely to leave the brand or service. In an embodiment, GBMs are built as a sequence of decision trees. Misclassified items are used as the training data for subsequent rounds to fine-tune the model.

FIG. 1 shows a block level diagram of a system 100 for developing a growth strategy, according to one or more embodiments. The system 100 disclosed herein comprises: a memory 104, a processor 106, input device 102, output interface 108 and a database 112. The processor 106 is communicatively coupled to the memory 104, input device 102, output interface 108 and the database 112. The processor may take the form of a single core processor, multi-core processor (e.g., a dual core processor, triple core processor, quad core processor, etc.), microprocessor, etc. In some embodiments, the processor 106 may be external to an apparatus (e.g., server), for example the processor 106 may be a remote processor (e.g., a cloud-based processor). Alternatively, or additionally, the processor 106 may be internal and/or local to the apparatus.

In one example, the processor 106 may be connected with the input devices 102 and the database 112 through a communication network 110.

It should be understood that the system 100, corresponds to computing devices. It may be understood that the server may be a network server. The server may comprise a web server, web application server and a server database and the like. It may be understood that the system 100 may also be implemented in a variety of computing systems, such as a laptop computer, a desktop computer, a notebook, a workstation, a mainframe computer, a cloud-based computing environment, or a smartphone and the like. It may be understood that the user may access the system 100 with a variety of portable computing devices, such as a laptop computer, a desktop computer, a notebook, a smartphone, a tablet, a phablet, and the like.

The components of the system 100 may be interconnected by any appropriate form or medium of digital data communication, e.g., a communication network. Examples of communication networks include a local area network ("LAN") and a wide area network ("WAN"), e.g., the Internet.

The processor 106 is operable to receive details of a client through the input device 102. The detail of the client may comprise a new client, an existing client, new work, a change in order, problem/issue in the work, and call emergency services. The detail of the client further comprises name of the client, name of entity, address of the entity, zip code, email address, website link, phone number or mobile number, first meeting date with the service provider.

The processor is further operable to receive details of the entity through the input device 102. The details of the entity comprises number of years completed in current business, number of current employees, number of current sales executives in the employees, annual revenue from sales, average transactions of the entity, any existing alternative contract, referred by whom.

The processor 106 receives data from the database 112 to further analyze the data.

Figure 2:
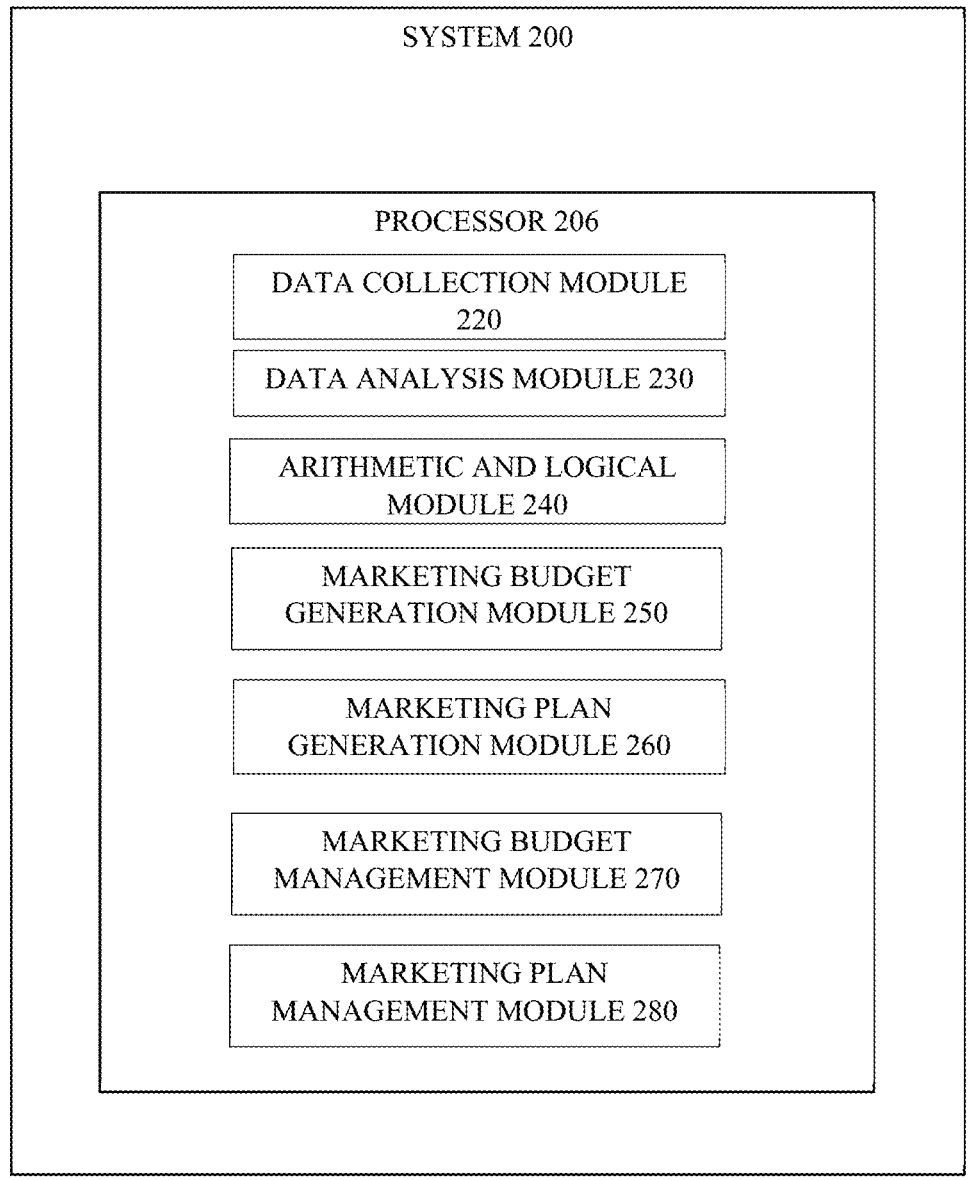
FIG. 2 shows a detailed block diagram of a processor of the system for developing a growth strategy, according to an embodiment of the invention.

FIG. 2 shows a detailed block diagram of a processor 206 of the system 200 for developing a growth strategy. The processor 206 may comprise; a data collection module 220, a data analysis module 230, an arithmetic and logical module 240, a marketing budget generation module 250, a marketing plan generation module 260, a marketing budget management module 270, a marketing plan management module 280. The data collection module 220 collects data of an entity over a past period from the database. The data analysis module 230 analyzes the collected data to identify entity values, ideal customers, strengths of the entity, opportunities, weaknesses, threats and needs of the customers. The arithmetic and logical module 240 generates revenue economics considering a current revenue and a target revenue goal as an input. A marketing budget is generated by working backward from the revenue economics by marketing budget generation module 250. Once a marketing budget is generated, the marketing plan is generated by taking into consideration the revenue economics, data analysis of the entity values, ideal customers, strengths of the entity, opportunities, weaknesses, threats, and needs of the customers from the past data by the marketing plan generation module 260.

The marketing budget management module 270 manages the allocation of the marketing budget by generating a marketing budget breakdown according to the marketing plan and marketing activities in a periodic manner. Also, the marketing budget management module 270 manages the cash reserves in the marketing budget for emergency expenditure. The marketing plan management module 280 conducts periodic reviews and ranking of the marketing plan. The marketing plan is then revised according to the periodic review. The system therefore generates a growth master plan from analyzing the data, generating the revenue economics, generating a marketing plan and a marketing budget, and generating a periodic roadmap for successful execution of the marketing plan. Growth master plan is a strategic plan. For example, a growth master plan is articulation of a strategy as to how the entity is going to grow in this current year, next year, in the next three years, and in the next five years. The marketing plan articulates how the entity wants to grow, what is needed for the entity to grow. The marketing plan is tactical. The marketing plan is basically a scope of work with a timeline and budget and a project plan.

In an embodiment, the historical data is analyzed by analyzing a recency of transaction, a frequency of transaction, a monetary value of transaction.

In an embodiment, the historical data of the entity comprises a history of an internal data of the entity and a history of shopping a product by a customer.

In an embodiment, the ideal prospects are identified by identifying potential customer segments, identifying potential market segments, identifying a particular product that the customer is interested in purchasing, identifying average quantity of a product that a customer purchases, and identifying capacity of the customer to spend on the product.

In an embodiment, the processor is further operable to generate a "why people buy canvas" to study and understand a customer.

In an embodiment, the "why people buy canvas" comprises questionnaire comprising a reason for a customer to make a purchase, problems faced by the customer, an existing solution, glitches in the existing solution, an outline of a potential solution, an unfair advantage to the entity, target market, payoff amount for a target market, a value statement, a goal for the entity, a market position of a product and the entity.

In an embodiment, the SWOT analysis comprises an eight-point analysis of strengths, weaknesses, opportunities, threats, and a combination thereof.

Figure 3A:
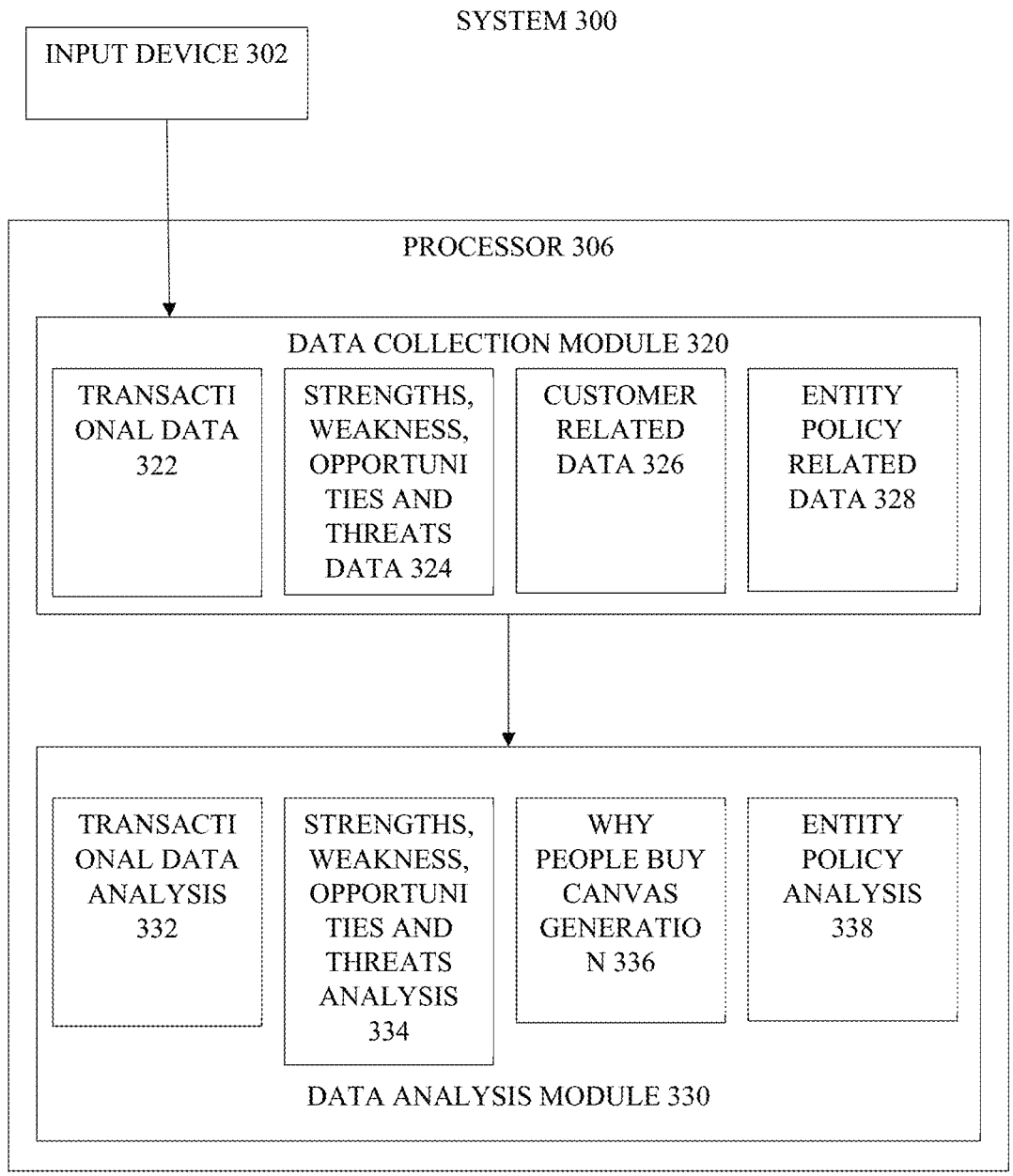
FIG. 3A shows a detailed block diagram of a data collection module and a data analysis module of the system for developing a growth strategy according to an embodiment of the invention.

FIG. 3A shows a detailed block diagram of a data collection module 320 and a data analysis module 330 of the system for developing a growth strategy according to one or more embodiments. The data collection module 320 receives historical data from the database. In entities such as hospitals, multiple data sources are used to store data related to customers. The multiple data sources may be separate or disparate sources used to store data using different codes or data structures or formats. Data from the multiple data sources may be used to obtain information related to customers. In an embodiment, for example, in case of banks, data from the data sources may comprise core data related to the banks. For example, core data related to banks may comprise customer demographic data, account and product holding data across all product types, transaction data related to customers and other data representing various facts related to the customer. In another embodiment, for example, data from multiple sources may comprise data related to customer relationship management such as campaign and service request data. Further, the data may comprise external data, such as prospect data, and data corresponding to external customer databases like credit rating, enquiry data, etc. Further, the database may comprise a data store. The data store is the entity data warehouse that stores detailed data related to the entity. In an embodiment, the data store gathers data from the data sources and stores the data. The data store stores the data as data structures in tables within the data store. For example, data store stores customer data, such as data related to customer details, customer demographics, product holding data, account transaction data and other data related to the customers.

The data is collected using data extraction techniques such as Extraction, Transform and Load (ETL) data extraction using data extraction software from ORACLE™, SQL™, COBOL™ and alike. The processor is configured to extract data from the database, transform the extracted data as needed and load the transformed data into the data analytics module. In an embodiment of the present invention, the data collection module 320 performs Extract Transform Load activities of data stored in tables in the operational data store. The ETL may include extracting existing fields from the tables without any changes, transforming the existing fields into new fields and loading the new fields into the database. The query for data extraction may contain sales data, purchase data, sales orders, invoices, purchase orders, shipping documents, payment details such as credit and debit for a time period, for example one year, three years or five years. The historical data may comprise a history of an internal data of the entity and a history of shopping a product by a customer. The historical data comprises transactional data 322 of the entity for a past period. As an example, the data collection module 320 is requested to receive transactional data from the last 3 years. The data collection module 320 receives the historical data of the last 3 years from the database. The transactional data 322 may comprise a revenue generated; type of products purchased by the customer for the past period. The transactional data 322 is further analyzed by the data analysis module 330.

In an embodiment, data stored in the database is manipulated using one or more statistical techniques. Examples of statistical techniques may include, but are not limited to, descriptive statistics, cluster analysis, forecasting, survival analysis, regression analysis and logit model. In an embodiment, statistical techniques may be developed based on CRM requirements of the entity. For example, descriptive statistics may be used to determine main features of various fields representing customer related data stored in the database. For example, descriptive statistics may provide recency, frequency and monetary features related to various transactions carried out by the customer. Descriptive statistics further facilitates meaningful comparison between the various fields. In another example, forecasting techniques may be used to forecast future revenue and cost related to product and service purchases made by the customer or likely to be made by the customer. In yet another example, survival analysis technique may be used for predicting survivability of a customer with the entity. In another example, logit model may be used for appropriately predicting outcome of customer behavior such as response to a marketing campaign, attrition etc. In various embodiments of the present invention, the arithmetic and logical module generates various statistical model outputs using the above statistical techniques and loads the various statistical model outputs onto the data collected.

The transactional data analysis 332 is analyzed by running a recency of transaction, a frequency of transaction, a monetary value of transaction analysis (RFM analysis). Several segmentation criteria are available for customer segmentation. In an embodiment, customer groups may be formed based on demographic characteristics (age, earnings, industry, etc.) as well as purchasing history (sales, purchasing activity, etc.). The RFM-analysis focuses on the latter, which is the sales and purchasing activity. RFM-analysis may be performed whenever a database with the required transaction information of each customer is available.

After the determination of the recency, frequency, and monetary values of all considered customers, recency, frequency, and monetary scores or classes are computed based on these values. These classes may be divided either by fixed intervals or by quartiles or quantiles so that each class contains the same number of customers. The classes are divided by fixed intervals since no overlaps can occur, and the value range may be chosen flexibly, e.g., in coordination with preliminary information from the sales department. It is not necessary to obtain groups of the same size in customer segmentation. Customers with unusual behavior would not noticeably differentiate themselves.

In an example scenario, it is assumed that a small customer database comprising 200 customers is given. In reality, a database consists of far more customers with a great variety. In this scenario, customers are supposed to be segmented based on their purchasing behavior over the last six weeks. The selection of the considered period can vary depending on the products sold by your company. Recommended are, e.g., quarterly, half-yearly, and annual calculations. The first step is the determination of the Recency, Frequency, and Monetary values of each customer. In this example, the resulting value ranges are divided into four bins and assigned to the R, F, and M-Scores 1-4 accordingly. Score 1 stands for the best possible result and 4 for the worst. Since high recency indicates non-recurring revenues, customers with maximum recency values get an R-score of 4. Customers who have made frequent interactions/purchases within the last six weeks and therefore have maximum frequency values get an F-score of 1. Accordingly, customers with maximum monetary values are assigned an M-score of 1. The different scores are merged into the so-called RFM-Score, which describes the respective customer quality. This value can be interpreted, in the most general sense, as Customer Lifetime Value (CLV). With four bins each, up to 64 different RFM-S cores or customer groups result. Considering the high number, it becomes difficult to detect significant differences between the groups. For this reason, the customer groups are consolidated into segments. Accordingly, customers with the optimal RFM score of 111 are classified as top customers, and those with the worst RFM score of 444 are classified as lost customers. In this way, a customer database of any size can be segmented.

Machine Learning methods are utilized to perform the RFM analysis. In segmentation, clustering algorithms such as K-Means or DBSCAN are utilized for the customer segmentation. Based on these, classification or time series algorithms may be used to predict the purchasing behavior of customers in the future. Classification algorithms can also be used to predict whether or not a customer will react to a specific marketing offer.

In an embodiment, segmentation is done using behavioral data since it is commonly available and continuously evolving with time and purchase history. A scoring method is developed to evaluate scores of Recency, Frequency, and Monetary. Finally, the scores of all three variables are consolidated as RFM score which is used to predict the future patterns by analyzing the present and past histories of the customer. In this context, it has been observed that the scores of three factors Recency, Frequency and Monetary directly proportional to customer's lifetime and retention.

Once the values of recency, frequency and monetary are calculated, the K-Means algorithm is applied to the variables to clusters of the customer base. The behavior of each cluster is analyzed to find the group of customers who give more profits to the company. Similarly, clustering is performed using two other algorithms namely, Fuzzy C—Means clustering and the proposed method with chosen initial centroids in the existing K—Means algorithm. Now that clusters of customers are found, it is necessary to understand the differences between these groups of customers. A thorough analysis is performed on the clusters to aid in finding the targeted customers and bestows them with appropriate promotions and offers. Also, a novel Repetitive Median based K-Means algorithm is proposed with an intention to reduce the number of iterations than the traditional clustering algorithms. The outcome of the proposed work is a meaningful customer segmentation which will be useful for marketing people.

An average lifetime value of a customer and the attrition factor of the customer is predicted by the RFM analysis on the transactional data and the clustering algorithms.

The transactional data analysis 332 helps identify the ideal prospects by identifying a potential customer segment that purchases products from the entity; the transactional data analysis 332 identifies the potential market segments from which the majority of customers have purchased products. The transactional data analysis 332 aids in identifying a particular product that the customer is interested in purchasing, identifying average quantity of a product that a customer purchases, and identifying capacity of the customer to spend on the product. Therefore, the transactional data analysis 332 helps in identifying an ideal prospect from the segments of the customers and the market to target the marketing plan. The transactional data analysis 332 provides a mapping of who may buy, what the customer may buy, why the customer may buy, how the customer may buy, and at what price the customer may buy for identifying the ideal prospects from the segment of customers.

In an embodiment, artificial intelligence power recommendation functions, which use customer data and predictive analytics to suggest products that customers are most likely to need or want and therefore buy.

Figure 3B:
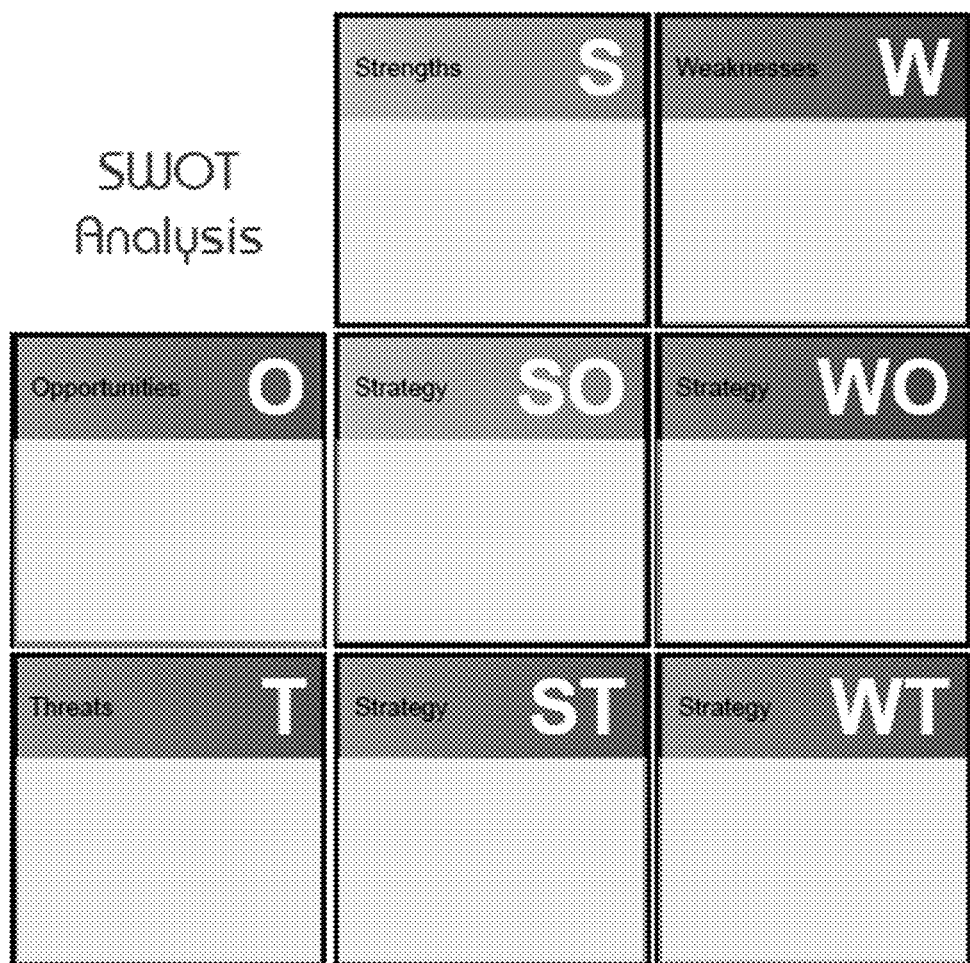
FIG. 3B illustrates an example of the form for the SWOT analysis displayed on the output interface of the system according to an embodiment of the invention.

In an embodiment, the data collection module 320 may collect strengths, weaknesses, opportunities, and threats data 324 from the input device 302 or from the database. The data collection module 320 may receive the strengths of the entity, the weaknesses of the entity, the marketing opportunities of the entity, and the potential threats that the entity faces. The processor 306 performs an eight-point strengths, weaknesses, opportunities, and threats analysis 334 (SWOT analysis). The SWOT analysis 334 is an eight-point analysis to identify strengths, weaknesses, opportunities, and threats, and also the combinations such as the opportunities in alignment with the strengths, the opportunities in alignment with the weaknesses, the threats in alignment with the strength and the threats in alignment with the weaknesses. The SWOT analysis 334 is performed to take an inventory of a current situation of the entity and to identify target market segments by generating the opportunities that are in alignment with the strengths of the entity. Also, the SWOT analysis 334 is performed to leverage the strengths of the entity that are in alignment with the opportunities while generating the target market segments. The SWOT analysis 334 also identifies the weaknesses that are in alignment with the opportunities, so that the weaknesses of the entity are avoided while identifying the target market segments. FIG. 3B illustrates an example of the form for the SWOT analysis 334, according to one or embodiments displayed on the output interface of the system.

In an embodiment, as shown in FIG. 3A, the data collection module 320 may receive customer related data 326 from the input device 302 or the database. The customer data is utilized for a "why people buy canvas" generation 336 by the data analysis module 330. The "why people buy canvas" generation 336 comprises questionnaire comprising, a reason for a customer to make a purchase, problems faced by the customer, an existing solution, glitches in the existing solution, an outline of a potential solution, an unfair advantage to the entity, target market, payoff amount for a target market, a value statement, a goal for the entity, a market position of a product and the entity. The "why people buy canvas" is generated for analyzing the customer problems, and the existing solutions. The "why people buy canvas" generation 336 helps in framing a potential solution in the target market segments according to the value statement, the goal for the entity, the market position of the product and the entity. FIG. 3C illustrates an example of the form for the "why people buy canvas", according to one or embodiments displayed on the output interface of the system.

In an embodiment, the data collection module 320 may receive entity policy related data 328 from the input device or the database. The entity policy related data 328 comprises purpose of the entity, current mission of the entity, core values of the entity, target market for a brand of the entity, position of the brand in a market, brand promise by the entity, strengths to leverage, strengths to develop, and sales and marketing economics. The entity policy related data 328 is analyzed in entity policy analysis 338 and then utilized further to generate a marketing plan. The data collection module 320 and the data analysis module 330 work hand in hand, which is for the transactional data analysis, SWOT analysis, "why people buy canvas" and the entity policy related data 328 are collected by the data collection module 320 first and then sent to the data analysis module 330.

The customer related data 326 and the entity policy related data 328 is analyzed through predictive analytics. Predictive analytics is a statistical analysis tool that can be implemented with the integrated framework of the present disclosure, predictive analytics uses historical and current data to identify future business risks and opportunities. These analyses weigh the relationship between several data elements to isolate each risk or potential. The risks and/or potentials can serve to guide the future actions of the entity. For example, future customer satisfaction may be predicted by using the current customer usage data. The factors that contribute to the results of the predictive analytics can be modified to perform a 'what-if type' of analysis to determine the impact of making these changes. Depending on the trend, the entity may take the necessary steps to retain the customer base.

In an embodiment, the system utilizes a classification model for the analysis of the customer related data 326 and the entity policy related data 328. The classification model puts data in categories based on what it learns from historical data. Classification models generate an answer yes or no to questions, providing broad analysis that is helpful for guiding decisive action. For example, based on the analysis of the company policy related data, the model understands the vision, mission, core values of the entity, thus helps in predicting which marketing plan is best suitable for the entity.

In an embodiment, the processor is further operable to receive the input comprising a current revenue of the entity, an average lifetime value of a customer, an attrition factor, and the target revenue goal of the entity to generate an output of realizable leads to reach the target revenue goal to generate the revenue economics.

In an embodiment, a diagnostic tree is used to provide an analysis of the enterprise's revenue based on individual revenue streams. Each revenue stream corresponds to the sale or use of various products or services offered by the enterprise. In an embodiment, the diagnostic tree is interactive. The diagnostic tree displays, among other things, the average revenue per user (ARPU) of the products or services corresponding to each revenue stream. The customer and revenue data are next used for generating interactive reports illustrating ARPU trends for analyzing ARPU changes over time. The diagnostic tree analysis and the ARPU trend analysis assist the business user in selecting a revenue stream in need of ARPU boosting and assessing the effectiveness of past marketing campaigns based on past ARPU trends accompanying such campaigns. The next action that must be taken is to identify an appropriate ARPU increase lever that may be exploited to increase ARPU in the targeted revenue stream. Revenue and customer data stored in a database and are mined to identify characteristics of customers relevant to increasing ARPU. The identified characteristics are used to create an ARPU increase model for predicting a customer's propensity to generate increased revenue and a positive response model for determining a customer's propensity to respond positively to a marketing campaign. Once models have been built, individual customers are scored according to their propensity to generate increased revenue and their propensity to respond favorably to a marketing campaign. The results of the scoring can be used for filtering the customer base. The scoring and filtering of the customer base leads to the compilation of a customer list representing the optimal mix of customers likely to respond favorably to a campaign and who will most likely generate additional revenue. Once the optimal customer list is compiled the campaign may be executed. According to an embodiment, the ARPU scouting/campaign analysis phase includes three components, a diagnostic tree analysis, trend analysis, and assessment by campaign effectiveness.

In an embodiment, the average lifetime value of the customer and the attrition factor of the customer is generated by bifurcating market segments and considering a percentage of customers for the market segments.

In an embodiment, the realizable leads required are used to generate required actual leads using the conversion metrics, wherein the conversion metrics account for various uncertain factors that lead to differences between the realizable leads and the required actual leads.

In an embodiment, the various uncertain factors comprise accounting in percentage of the required actual leads to get to qualified leads, accounting in percentage of qualified leads to get to appointments set, accounting in percentage of the appointments set to get to actual shows for the appointment, accounting in percentage of actual shows to get to qualified shows for the appointment, and accounting in percentage of qualified shows for the appointment to get to the realizable leads.

In an embodiment, a realized revenue is generated by considering the required actual leads generated multiplied by the average lifetime value of the customer.

In an embodiment, a customer acquisition cost basis is generated based on a factor derived from how much money the entity can afford to spend to generate realizable leads considering profit margin and sustainability of a business of the entity.

In an embodiment, the stage from the realizable leads to the required actual leads comprises stage to calculate a number of the required actual leads, stage to calculate a number of qualified leads, stage to calculate a number of appointments set, stage to calculate a number of actual shows for an appointment, stage to calculate a number of qualified shows for an appointment, and stage to calculate a number of the realizable leads.

In an embodiment, the customer acquisition cost is translated to each stage from the realizable leads to the required actual leads.

In an embodiment, a customer value matrix is formulated from the customer acquisition cost divided with a factor comprising any value between 1 and 10 for each stage to reach the realizable leads to a required actual lead.

In an embodiment, a marketing budget is predicted from a ratio of the customer acquisition cost to an average lifetime value of a customer.

Figure 4A:
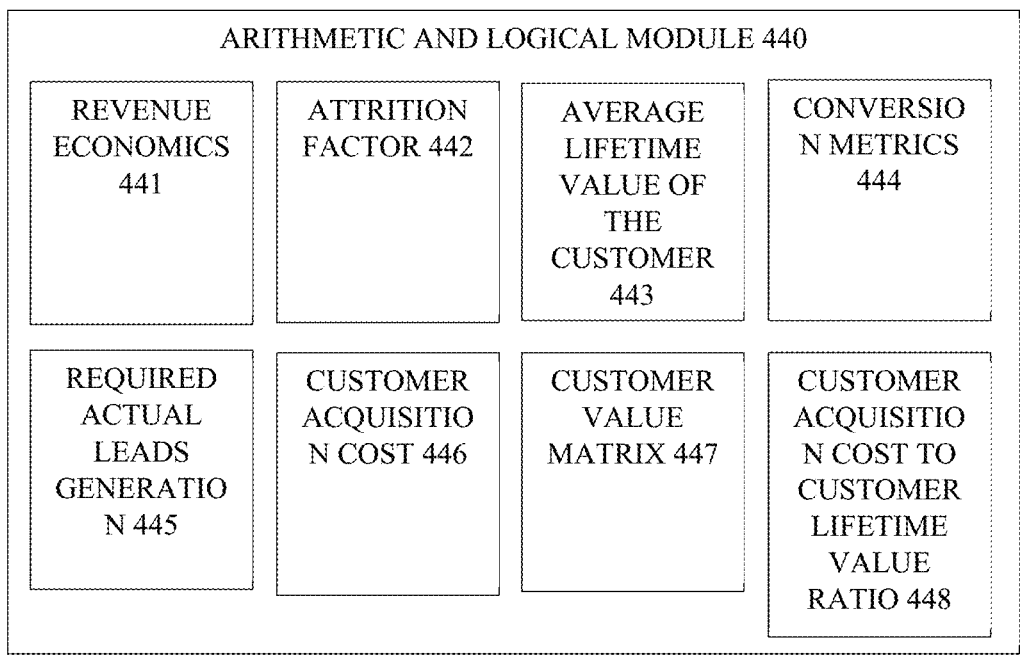
FIG. 4A shows a detailed block diagram of an arithmetic and logic module of the system for developing a growth strategy according to an embodiment of the invention.
Figure 4B:
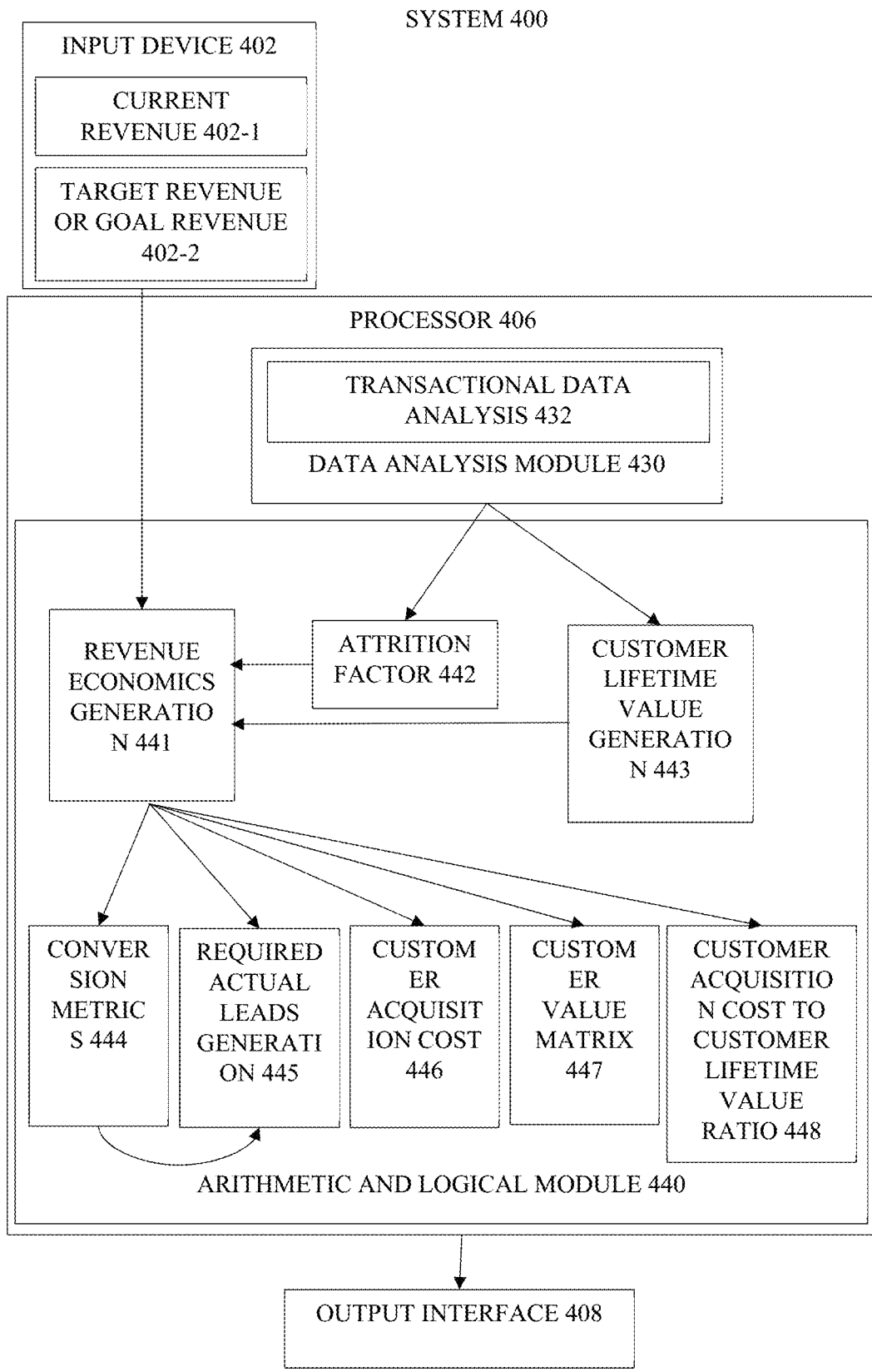
FIG. 4B shows the revenue economics generation through the arithmetic and logic module of the system for developing a growth strategy according to an embodiment of the invention.

FIGS. 4A and 4B shows a detailed block diagram of an arithmetic and logic module 440 of the system 400 for developing a growth strategy according to one or more embodiments. The arithmetic and logical module 440 generates in real-time revenue economics 441 by receiving input of a current revenue and target revenue. The attrition factor 442 and average lifetime value of the customer 443 is also derived by the arithmetic and logical module 440, using clustering algorithms from the transactional data analysis. The required actual leads 445 is derived automatically using the revenue economics 441 and the conversion metrics 444. A customer acquisition cost 446 and a customer value matrix 447 is generated using the revenue economics 441 and the conversion metrics 444. A customer acquisition cost to customer lifetime value ratio 448 is also generated by the arithmetic and logical module 440. Referring to FIG. 4B, the arithmetic and logic module 440 generates the revenue economics 441 using a target revenue goal 402-2 as the main input. The input is received by the arithmetic and logic module 440 of the processor 406 from the input device 402. The processor 406 is further operable to: receive the input comprising a current revenue 402-1 of the entity, an average lifetime value of a customer 443, an attrition factor 442, and the target revenue 402-2 of the entity to generate an output of realizable leads to reach the target revenue goal to generate the revenue economics 441. The revenue economics comprises target revenue goal, number of realizable leads, a number of required actual leads 445 and a customer value matrix 447. Wherein the average lifetime value of the customer 443 and the attrition factor 442 of the customer is generated automatically by bifurcating market segments and considering a percentage of customers for the market segments. The percentage of customers in each customer segment are retrieved from the transactional data analysis. The percentage of customers in each customer segment gives the average lifetime value of a customer 443. For example, to identify the target customer segment, historical data of the revenue and the transactional data in a last period is reviewed, e.g., the transactional data for the last 5 years is reviewed. The market segments that are served successfully in these last 5 years are identified. The market segments where the entity is likely to earn more and reach the target goal in the next three years are identified from the transactional data of the last 5 years. A trend in the customer segments for the entity is identified from the historical data and the trend is utilized to forecast future marketing growth for an entity. The target market segment may be chosen voluntarily based on the realistic values of the market segments mostly impacted by the entity from the transactional data analysis.

For example, for the calculation of target revenue goal and realizable leads, if the target revenue is one million dollars, and the current revenue is half a million dollars, then the target revenue goal is half a million dollars. Considering the attrition factor as six thousand dollars, the arithmetic and logical module 440 of the processor 406 generates the target revenue goal of half a million and six thousand dollars. In order to get the realizable leads the processor 406, through the arithmetic and logical module 440, is operable to divide target revenue goal by the average lifetime value of the customer. Therefore, one hundred and one realizable leads are generated by considering five thousand dollars as the customer lifetime value.

In an embodiment, conversion metrics 444 is used to convert the realizable leads to required actual leads 445. The conversion metrics 444 accounts for various uncertain factors that lead to differences between the realizable leads and the required actual leads 445. The various uncertain factors may comprise accounting in percentage of the required actual leads to get to qualified leads, accounting in percentage of qualified leads to get to appointments set, accounting in percentage of the appointments set to get to actual shows for the appointment, accounting in percentage of actual shows to get to qualified shows for the appointment, and accounting in percentage of qualified shows for the appointment to get to the realizable leads. Therefore, the required actual leads 445 converted by the conversion metrics may be greater in number than the realizable leads as there is an attrition in percentage at every stage from the realizable leads to the required actual leads. The stage from the realizable leads to the required actual leads comprises stage to calculate a number of the required actual leads, stage to calculate a number of qualified leads, stage to calculate a number of appointments set, stage to calculate a number of actual shows for an appointment, stage to calculate a number of qualified shows for an appointment, and stage to calculate a number of the realizable leads.

In an embodiment, after the generation of the required actual leads, a required revenue is calculated by the processor 406. The required revenue is calculated by the processor 406 considering the required actual leads generated multiplied by the average lifetime value of the customer.

In an embodiment, after the generation of the required actual leads 445 to reach the target revenue goal automatically, a customer acquisition cost 446 is generated by the processor 406. The customer acquisition cost 446 is the cost to acquire new customers. Therefore, the customer acquisition cost 446 is the cost of acquiring the customers according to the required actual leads 445 generated. The customer acquisition cost 446 is generated by dividing the realized revenue growth by the number of leads at each stage. The customer acquisition cost 446 is generated based on a factor derived from how much money the entity can afford to spend to generate realizable leads considering profit margin and sustainability of a business of the entity. On generation of the customer acquisition cost, a ratio of the customer acquisition cost to average lifetime value 448 of the customer is generated. The customer acquisition cost 446 is then translated to each stage from the realizable leads to the required actual leads. That is, the customer acquisition cost 446 is translated into cost of acquiring one required actual lead, cost of acquiring one qualified lead, cost of acquiring one appointment set, cost of acquiring one actual show for an appointment, cost of acquiring one qualified show for an appointment, and cost of acquiring one realizable lead. The translated customer acquisition cost is further utilized to formulate a customer value matrix. In an embodiment, the customer value matrix is formulated from the customer acquisition cost divided with a factor comprising any value between 1 and 10 for each stage to reach the realizable leads to a required actual lead. These factors may vary on the entity's capacity to spend and the profit the entity wants to achieve from one realizable lead.

For example, the cost of acquiring one required actual lead is divided by three times the cost to reach a viable profit; five times the cost to reach a sustainable profit; and ten times the cost to reach a controlled profit. The cost at each stage from the realizable leads to a required actual lead formulates the customer value matrix. The cost of acquiring the leads at each stage is divided with the factor to formulate the customer value matrix by the processor 406. The cost of acquiring one required actual lead, the cost of acquiring one qualified lead, the cost of acquiring one appointment set, the cost of acquiring one actual show for an appointment, the cost of acquiring one qualified show for an appointment, and the cost of acquiring one realizable lead is divided with the factor comprising any value between 1 and 10 formulates the customer value matrix. The customer acquisition cost is divided by the factor comprising any value between 1 and 10 considering the fact that for every 1 dollar in acquiring the customer, for sales and marketing, 3 dollars must be the revenue generated to break even to recover the customer acquisition cost spent to acquire the customer. When 5 dollars revenue is generated back per dollar invested in acquiring the customer, marketing, and sales that generates a sustainable marketing model. When 10 dollars revenue is generated back per dollar invested in acquiring the customer, marketing, and sales, it is referred to as a jackpot. It will be hard to sustain.

FIG. 4C illustrates an example of revenue economics generation through the system for developing a growth strategy of an entity or organization according to one or more embodiments. FIG. 4C shows a form that is displayed on the output interface to interact with a user. The form comprises input boxes for the current revenue and the target revenue. When the current revenue and the target revenue is given as an input to the form, a target revenue goal is calculated by the system and displayed in the box showing the target revenue goal. When the attrition factor is input, the value of the target revenue goal is updated by addition of the value of the attrition factor. The target revenue goal is updated by the addition of the average lifetime value of the customer when the average lifetime value of the customer is input. The form also has each stage for generating the required actual leads from the realizable leads by using the conversion metrics accounting for various uncertain factors.

The various uncertain factors may comprise accounting in percentage of the required actual leads to get to qualified leads, accounting in percentage of qualified leads to get to appointments set, accounting in percentage of the appointments set to get to actual shows for the appointment, accounting in percentage of actual shows to get to qualified shows for the appointment, and accounting in percentage of qualified shows for the appointments set to get to the realizable leads. This percentage of the uncertain factors are to be inputted in the boxes provided in the form, to get the number of qualified leads, the number of appointments set, the number actual shows for the appointments set, the number of qualified shows for the appointment, and the number of required actual leads. Also, the percentage of uncertain factors and the conversion metrics is utilized to generate the customer acquisition cost at each stage. The customer acquisition cost is then translated into a customer value matrix by multiplying by a factor of 3 times to get a viable growth in the target revenue goal, divided by a factor of 5 to get a sustainable growth in the target revenue goal and divided by a factor of 10 to get a controlled growth in the target revenue goal.

Figure 5A:
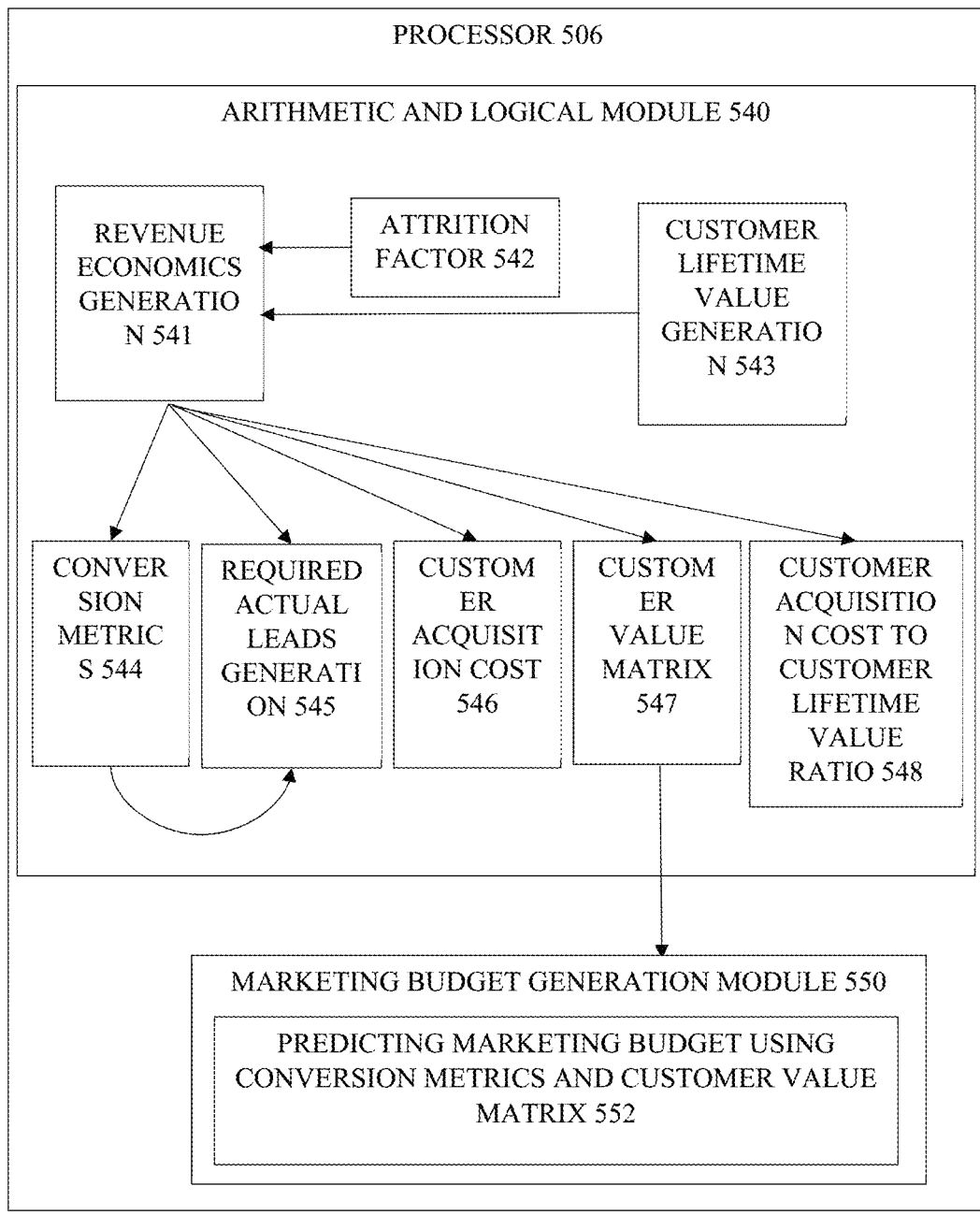
FIG. 5A shows the detailed block diagram for generation of marketing budget through the processor in the system for developing a growth strategy according to an embodiment of the invention.

FIG. 5A shows the detailed block diagram for generation of marketing budget through the processor in the system for developing a growth strategy of an entity or organization according to one or more embodiments. The marketing budget generation module 550 generates a marketing budget through predicting marketing budget using conversion metrics and customer value matrix 552. The marketing budget is predicted by selecting a value from the customer value matrix 547 by considering the factor derived from how much money the entity can afford to spend to generate realizable leads considering profit margin and sustainability of a business of the entity. For example, an entity that wants sustainable growth chooses 5 times the customer acquisition cost to acquire the required actual leads 545. The processor 506 generates the marketing budget through the marketing budget generation module 550 by working backwards from the revenue economics 541 generated. The working backwards from the revenue economics 541 comprises generating by the processor 506 the required actual leads 545 using the conversion metrics 544; generating the realized revenue goal by multiplying the average lifetime value of a customer 543 with the conversion metrics 544; generating the customer acquisition cost 546 by the processor 506 through the arithmetic and logical module 540; generation of the ratio of the customer acquisition cost to the average lifetime value 548 of the customer, and the generation of the customer value matrix 547. As an example, the cost of acquiring one of the required actual leads in the factor of 3 in the customer value matrix is selected and is then multiplied by the required actual leads from the conversion metrics. The output of the multiplication of the required actual leads and the cost of acquiring one of the required actual leads is the marketing budget of the entity. For example, FIG. 5B illustrates the required actual leads for 101 realizable leads to reach the target revenue goal considering the percentage of uncertain factors at each stage to reach the required actual leads. It is seen that 250 required actual leads are generated to get a guaranteed show of 101 leads to generate the target revenue goal. A realizable revenue goal is generated by multiplying the realizable leads into the average lifetime value of the customer. That is $303,000 by considering the average lifetime value of the customer as $3000. The realizable revenue goal is divided by the number of leads that are generated at each stage from the required actual leads to the realizable leads to get the customer acquisition cost for one lead at every stage from the required actual leads to the realizable leads. A customer value matrix is generated as shown in FIG. 5B by dividing the customer acquisition cost for one lead at every stage from the required actual leads to the realizable leads by a factor of 3, 5 and 10. Now if the entity wants sustainable growth, then the value of the required actual leads $242.22 is then multiplied by the required actual leads to get the marketing budget of the entity. This calculation is done inside the processor 506 in the arithmetic and logical module 540 by receiving the realizable leads and the uncertain factor percentage at each stage of the conversion metrics as the input.

Figure 6A:
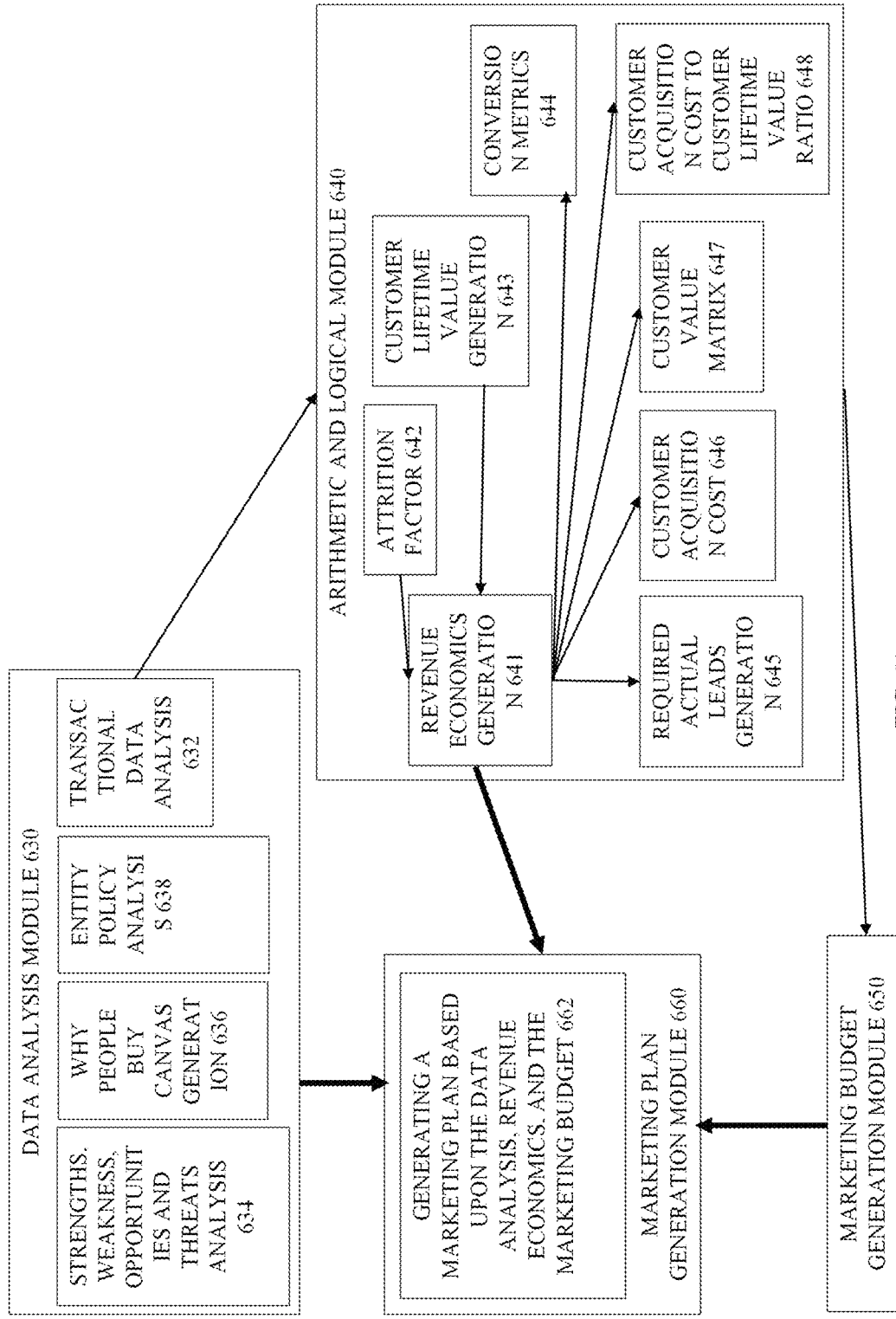
FIG. 6A shows a detailed block diagram for generation of a marketing plan through the processor in the system for developing a growth strategy according to an embodiment of the invention.

FIG. 6A shows a detailed block diagram for generation of a marketing plan through the processor in the system for developing a growth strategy according to one or more embodiments. A marketing plan is generated by the marketing plan generation module 660 of the processor. The marketing plan for the future period considers the marketing budget for marketing activities. The marketing plan is generated by considering the data analysis by the data analysis module 630, the revenue economics generated by the arithmetic and logical module 640 and the marketing budget generated by the marketing budget generation module 650. The transactional data analysis 632 determines the ideal customers to be targeted based upon the analysis for the marketing plan. The marketing plan is generated by using a time series model and a forecast model for predictive analytics. The time series model comprises a sequence of data points captured, using time as the input parameter. The time series model uses the last year of data to develop a numerical metric and predicts the future period of data using that metric. For example, a use case for this model includes the number of daily calls received in the past three months, sales for the past 20 quarters, or the number of patients who showed up at a given hospital in the past six weeks. It is a potent means of understanding the way a singular metric is developing over time with a level of accuracy beyond simple averages. It also considers seasons of the year or events that could impact the metric.

In an embodiment, a time series model is used for predictive analytics which may forecast for multiple projects or multiple regions at the same time instead of just one at a time.

The forecast model deals in metric value prediction, estimating numeric value for new data based on learnings from historical data. The forecast model also considers multiple input parameters. For example, if a restaurant owner wants to predict the number of customers, he/she is likely to receive in the following week, the forecast model will consider factors that could impact the number of customers, such as: Is there an event close by? What is the weather forecast? Is there an illness going around? and then predict the number of customers.

The SWOT analysis 634 in the data analysis module 630 identifies the opportunities that are in alignment with the strengths of the entity so the opportunities in alignment with the strengths are utilized during the marketing activities. Also, the weaknesses in alignment with the opportunities identified by the SWOT analysis 634 are avoided during the marketing activities. The revenue economics 641 provides the realizable leads for reaching a target revenue set by the entity. The revenue economics are generated using the attrition factor 642 and the average lifetime value of the customer 643. The revenue economics provide the realizable leads and a target revenue goal for the entity to generate the marketing plan. The conversion metrics 644 is used to generate the required actual leads 645 from the realizable leads. The average lifetime value of the customer and the conversion metrics 644 are used to generate the realized revenue goal. The realized revenue goal is divided by the number of leads at each stage in the conversion metrics 644 to get the customer acquisition cost 645 of each stage. A customer value matrix is generated by dividing the customer acquisition cost 646 by a factor. For example, the factor is any value between 1 to 10. The customer value matrix 647 is utilized to generate the marketing budget by the marketing budget generation module 650. The marketing budget is taken into consideration to generate a marketing plan. The "why people buy canvas" 636 generated by the data analysis module is considered to understand the problems and the existing solutions of the products and services to generate a marketing plan that solves the existing problems of the customer. Thus, while generating the marketing plan, marketing activities are decided to overcome the existing problems and are in alignment with the core values of the entity. The entity policy analysis 638 is done to understand the policies of the entity and to incorporate the policies in the marketing plan 662 that is generated. The entity policy comprises the purpose of the entity, current mission of the entity, core values of the entity, target market for a brand of the entity, position of the brand in a market, brand promise by the entity, the strengths to leverage, the strengths to develop, and sales and marketing economics. Therefore, the marketing plan does not conflict with the entity policy. The target revenue goal generated by the revenue economics is considered while generating the marketing plan, so the marketing plan is generated such that the revenue generated reaches the target revenue goal. Also, the marketing budget is taken into consideration while generating the marketing plan. For example, a 1000-day marketing plan is generated by considering the ideal customers, opportunities, strengths, the "why people buy canvas", entity policy, the revenue economics, and the marketing budget.

In an embodiment, the marketing plan comprises generating the marketing activities and a timeline for the marketing activities that assist in reaching the realizable leads.

In an embodiment, predictive analytics, a method that uses analytics data to make predictions about how customers behave, is used in assisting to reach the realizable leads. Propensity modeling may be applied to a number of different areas, such as predicting the likelihood of a given customer to convert, predicting what price a customer is likely to convert at, or what customers are most likely to make repeat purchases. In an embodiment, the accuracy of the propensity model depends on the data used to create it.

In an embodiment, lead scoring is used. Propensity models generated by machine learning will be trained to score leads based on a decided criteria so that your sales team can establish how likely a given lead will be realizable and if they are worth devoting time to. Thus the AI models can be used to assist the team in suggesting the most relevant leads, by which the sales team can save time and concentrate their energy where it is most effective. The insights into a lead's propensity to buy can also be used to target sales and discounts where they are most effective.

The marketing activities may comprise advertising, selling, and delivering products to consumers or other businesses. Some marketing activities may be done by affiliates on behalf of a company. The marketing plan comprises a plan to execute marketing activities periodically in the future period to reach a realized revenue in a given period. The marketing activities are planned in a periodic manner. The marketing activities are performed in house or are outsourced. A team of service providers performs the marketing activities, either in house or outsourced. The service providers may comprise coaches and consultants, Chief Marketing Officers (CMO), Chief Financial Officer (CFOs), graphic designer, copywriter, social posting/advertising personnel, webmaster and digital technical crew, website hosting provider, marketing automation crew, in house marketing—(Customer Relationship Management) CRM operator, and print mail production executive For example, recommended daily marketing activities comprises morning sales meetings, follow up calls for the day that are 3 to 4 conversations per day, daily social media posts, email appointment reminders, marketing emails, video thank you messages for clients, video messages for prospects.

In an embodiment, machine learning and data science models are used alongside the conventional methods, where the system can propose next-best actions, how to take discussions with the customer further and how to present a certain targeted option. Intelligent systems are deployed to understand users and their buying patterns, so a business can present advertisements for marketing specific products that the user is most likely to opt for. Artificial intelligence technologies are used to make automated decisions based on data collection, data analysis, and additional observations of audience or economic trends that may impact marketing efforts.

The recommended weekly marketing activities may comprise opportunity staging and management, lead scoring and lead source scoring, asking for referrals from grateful clients/parents, sending out referral requests, making client touch calls, performing weekly cash in review, performing weekly cash out review, comparing this week's opportunity review with last week's opportunity review, comparing this week's incoming leads review with last week's incoming leads review, comparing this week's lost opportunities review with last week's lost opportunities review.

The recommended monthly marketing activities, client newsletter, prospect newsletter, partner newsletter, newsletter inserts for other people's newsletter, referral contest, direct mail schedule for campaign of the month, radio advertising schedule, television advertising schedule, print media advertising schedule, testimonials and reviews (written & video) requests, monthly give away, birthday cards & gifts, referring partner birthdays, writing blogs and lead magnets, doing radio and television interviews, trade shows & exhibits, sponsorships for events, team training and goal review, reviewing and updating search engine optimization SEO, pay per click ads and social media advertising, reviewing of call tracking data, calculation of return on investment ROI from last month. The recommended quarterly marketing activities comprise referring partner event, gratitude dinners, client appreciation event, media planning (radio & television), research for print media opportunities, goal setting meeting with team leaders, landing page and custom site updates, budget and ROI analysis to plan next quarter, quarterly review of profit and loss P&L, quarterly review of upcoming events, quarterly review of marketing activities, quarterly review of staff and budget, quarterly newsletter or journals, quarterly public relations pr campaigns, updating reading library for the quarter. The recommended annual marketing activities comprise annual marketing budget, annual charity budget, annual sponsorship budget, annual event budget, major holiday or client appreciation events planning, major referral partner events planning, big team trip for strategic planning on the calendar, setting advertising goals and budgets for the year, researching for new growth opportunities, new referral relationship planning/new markets, calculation of yearly ROI by media category, annual marketing calendar, annual travel calendar, annual event calendar, establishing before event and after event milestones, calculating last year's ROI by media category, establishing annual marketing goals, establishing annual sales goals.

In an embodiment, the marketing plan comprises a plan to execute marketing activities periodically in the future period to reach the realized revenue in a given period.

In an embodiment, the marketing plan for the future period comprises generating marketing activities and a timeline for the marketing activities that assist in realizable leads.

In an embodiment, the marketing activities are outsourced, performed in house or a combination thereof.

In an embodiment, the marketing plan is generated considering factors comprising purpose of the entity, current mission of the entity, core values of the entity, target market for a brand of the entity, position of the brand in a market, brand promise by the entity, strengths to leverage, strengths to develop, and sales and marketing economics.

In an embodiment, the marketing plan comprises a marketing asset acquisition and a marketing asset management.

In an embodiment, the marketing asset management comprises management of technology infrastructure assets, management of corporate and personal brand assets, management of marketing automation assets, management of customer relationship management system setup and sales automation, management of print assets, management of online presence assets, management of sales copy assets, management of assets for speakers and authors.

In an embodiment, the marketing plan further comprises allocation of marketing budget to the marketing activities.

In an embodiment, the processor is further operable to generate the budget breakdown comprising allocation of money from the budget to each of the marketing activities according to the marketing plan.

In an embodiment, the processor is further operable to track a part of the budget allocated and a part of the budget unallocated, available, in cash reserves to spend on discretionary spending to pursue new unplanned opportunities and fund new or unplanned expenses without disrupting the budget.

In an embodiment, the marketing plan is implemented and reviewed periodically based on performance.

In an embodiment, the marketing plan is reviewed by ranking the marketing plan according to the awareness of the marketing plan, acquisition of the market, activate sales of the product, revenue generated, retention, brand position of the entity, need for improvement in the marketing plan and solution to improve the marketing plan.

FIG. 6B shows an illustration of an example of a form of the marketing plan generated by the system according to an embodiment of the invention. The marketing activities are listed in the first column and are tick marked in various columns in which to show the timeline or period the marketing activity is to be performed.

In an embodiment, the marketing plan is executed in a periodic manner according to the marketing activities. The marketing activities may be executed by outsourcing or performed in house by the entity.

Figure 7A:
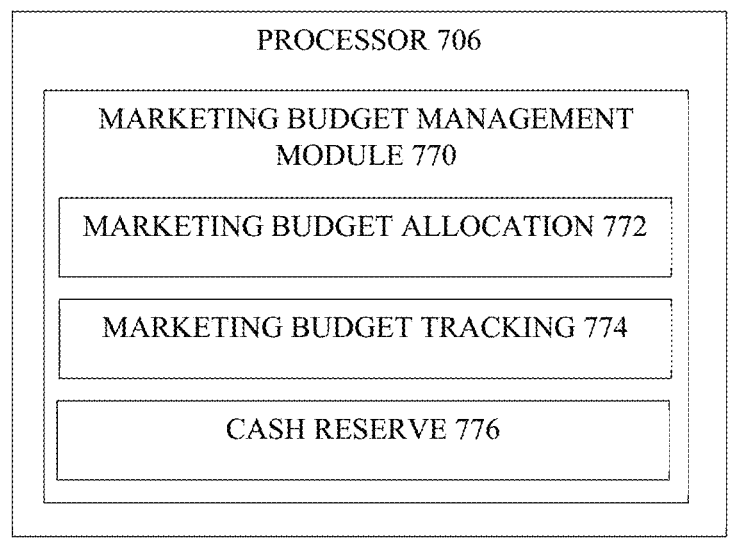
FIG. 7A shows a detailed block diagram for the marketing budget management module of the system for developing a growth strategy according to an embodiment of the invention.

FIG. 7A shows a detailed block diagram for the marketing budget management module of the system for developing a growth strategy according to one or more embodiments. The marketing plan further comprises allocation of a marketing budget to the marketing activities by generating a marketing budget breakdown. The marketing budget breakdown comprising allocation of money from the marketing budget to each of the marketing activities according to the marketing plan. The allocation of money from the marketing budget is done through the marketing budget management module 770. The marketing budget allocation 772 to each marketing activity comprises allocation of the marketing budget to the internal staff costs, marketing research, external marketing, internal marketing, agent, or outsourcing costs in case the marketing plan is executed by outsourcing. FIG. 7B shows an example of a form displayed on the output interface of the system to generate a marketing budget breakdown according to each of the marketing activities. The marketing budget allocation is according to the priorities of the entity. For example, an entity is interested to invest more in marketing research and then build a market plan according to the marketing research to reach the target revenue more efficiently, then more of the marketing budget is allocated to the marketing research activity. The internal staff costs may include salaries, benefits, payroll taxes, bonuses, and other expenses. Marketing research may comprise surveys and research, demographics, and list rentals. The external marketing may comprise offline marketing, online marketing, radio advertising, television advertising, social media advertising, print media advertising, public relations, external events, referral marketing. Internal marketing may comprise direct and digital marketing, in house events and promotions.

As shown in FIG. 7A the marketing budget management module 770 also keeps track of the budget allocation through marketing budget tracking 774. The marketing budget tracking 774 keeps a track on a part of the marketing budget allocated and an unallocated part of the marketing budget available in cash reserve 776. The tracking is done continuously by the processor 706. The marketing budget management module 770 keeps the track on the budget allocation in case there is a need to spend on discretionary spending. The discretionary spending may be for pursuing new unplanned opportunities and funding new or unplanned expenses. The new unplanned opportunities and funding new or unplanned expenses is done without disrupting the marketing budget because of the marketing budget tracking 774, as it keeps a track on a part of the marketing budget allocated and an unallocated part of the marketing budget available in cash reserve 776.

Figure 8A:
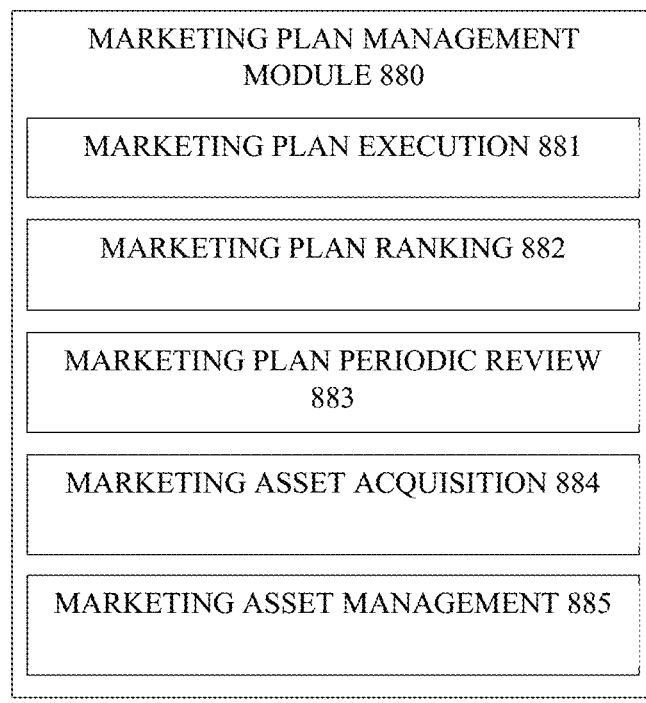
FIG. 8A shows a detailed block diagram for the marketing plan management module of the system for developing a growth strategy according to an embodiment of the invention.

FIG. 8A shows a detailed block diagram for the marketing plan management module of the system for developing a growth strategy for an entity or organization according to one or more embodiments. The marketing plan management module 880 comprises marketing plan execution 881. The marketing plan is executed in a periodic manner according to the marketing activities. The marketing plan execution is also done by dividing the marketing plan into a quarterly plan. FIG. 8B shows an example of the quarterly plan according to one or more embodiments. The quarterly plan consists of the marketing activities to be carried out in each quarter of the year. The quarterly plan is a 3-month plan. The quarterly plan comprises the activities to be carried out in that particular quarter of the year. A marketing budget is allocated to the marketing activities that are to be done in that quarter. A questionnaire with tools such as a strategic coach©, an impact filter© to articulate the marketing plan into a project plan. The questionnaire comprises questions like; what do you want to accomplish? What is the motivation? For the purpose of the quarterly plan, what is the difference the quarterly plan makes? What impact will the quarterly plan have? For the importance of the plan, what is the ideal outcome of the plan? What specific results must be performed for this project to be a success for the success criteria? What is the best result expected and what is at risk if the plan is not a success? The questionnaire is used to strategize the way an entity wants to implement the marketing plan, and a method to convert a marketing plan into a completed project. From the questionnaire one can derive the tasks or activities to be done by the entity, additional activities that may be done by the entity and the compulsory activities that are must to make the marketing plan work. A project plan is generated by the questionnaire, where one may know tasks and activities to be carried out, a timeline for the activities to be completed and a method by which the task and activities are accomplished. FIG. 8C shows an example of the impact filter of the quarterly plan. As shown in FIG. 8C the questionnaire gives a clarity of what a finished project plan may look like. The questionnaire also shows about the activities to be done. At the left side of the questionnaire is articulation of the strategy and the right side of the questionnaire is articulation of an outline of what a finished project may look like. Therefore, the questionnaire gives a roadmap to go from an idea to an execution stage.

In an embodiment, the quarterly plan comprises a strategy circle. The strategy circle comprises the vision; wherein the vision comprises an expected goal of the quarterly plan and an expected result of the quarterly plan. The strategy circle also comprises a form to list out the obstacles that are faced as an opposition of the quarterly plan, and strategies to transform the obstacles into possible advantages. The strategy circle further comprises a row to list out the possible actions to be taken to get the desired results. The form of the quarterly plan has to be filled out by the user of the system. FIG. 8D shows an example of a form for the strategy circle.

Figure 8E:
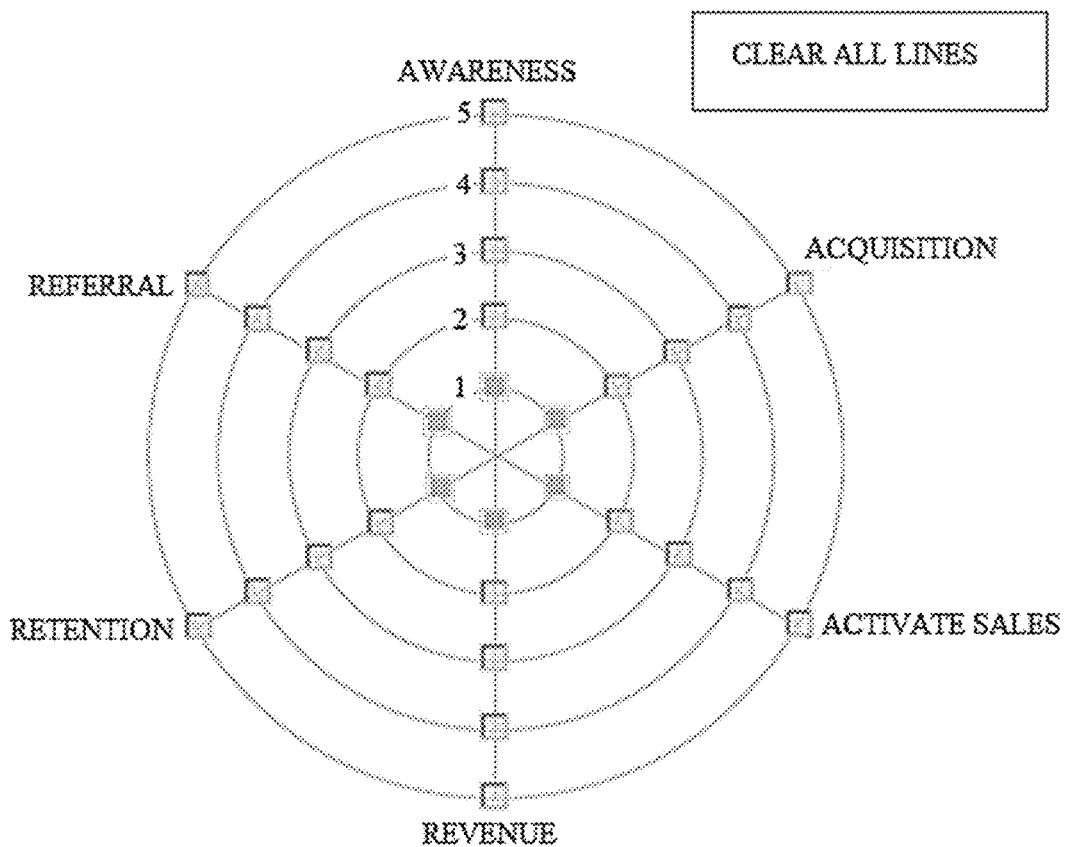
FIG. 8E shows an example of a form to rank the marketing plan according to an embodiment of the invention.

In an embodiment, the marketing plan is periodically reviewed in the marketing plan periodic review 883 and periodically ranked upon the performance of the marketing plan in the marketing plan ranking 882. The marketing plan is ranked on a scale and then a weighted score is developed. For example, the marketing plan is ranked on a scale of 1 to 5 and a weighted score is given on the scale of 1 to 10. The marketing plan is reviewed by the marketing plan review 883 by ranking the marketing plan in the marketing plan ranking 882 according to an awareness of the marketing plan, acquisition, activation of sales of a product, revenue generated, retention, brand position of the entity, need for improvement in the marketing plan and solutions to improve the marketing plan. The marketing plan is ranked using the classification model of the machine learning algorithms. The system is trained by the classification model algorithm to rank the marketing plan based upon a parameter such as awareness of the marketing plan, acquisition, activation of sales of a product, revenue generated, retention, brand position of the entity, need for improvement in the marketing plan and solutions to improve the marketing plan. The algorithm learns through the data of the marketing plan and historical data of a performance of the marketing plan in a last quarter or a time period. The machine learning algorithm ranks the marketing plan based upon the historical data according to the parameters mentioned. Thus, the ranking of the marketing plan provides an insight to modify the marketing plan to reach the target revenue goal in the given time period. The awareness refers to awareness of the brand, the visits, and the views to the system. Acquisition refers to acquisition of the customer and the generation of new leads, activate sales refers to nurturing of the leads to potential appointment shows and pipelining of sale of the product. Revenue refers to the revenue generated by conversion of the leads into sales. Retention refers to the customer experience on a scale of a number that drives to retention, resell, upsell of the product. Referral refers to the rating, reviews, and referrals to other customers by the existing customer. By the ranking and review of the marketing plan, the areas of the marketing plan that need improvement are identified, and the potential solutions to improve the marketing plan are suggested. The marketing plan is reviewed and ranked periodically, and changes are made to the marketing plan according to the review and ranking of the marketing plan. For example, the marketing plan is reviewed every 3 months and the marketing plan is revised every three months according to the review. FIG. 8E shows an example of the form to rank the marketing plan.

In an embodiment, the marketing plan comprises a marketing asset acquisition 884 and a marketing asset management 885. The marketing asset acquisition 884 and marketing asset management 885 comprises management of technology infrastructure assets, management of corporate and personal brand assets, management of marketing automation assets, management of customer relationship management system setup and sales automation, management of print assets, management of online presence assets, management of sales copy assets, management of assets for speakers and authors. The management of technology infrastructure assets comprises management of web hosting and content management system, customer relationship management system, marketing automation system, sales automation system, service delivery automation system, database administration system, results monitoring and reports dashboard system, marketing activities management system.

In an embodiment, the management of the corporate and personal brand assets comprises brand standards and a style guide, brand voice document, authority marketing book, personal magazine tear sheet, speaker brochure & media kit, personal stationary, book covers for 'coming soon' books, rack card, in office and door signage, trade show and event exhibit booth, brand conforming social media presence, sales presentation template.

In an embodiment, the management of marketing assets comprises lead magnet delivery system, new lead follow-up system, long term nurture system, new client/patient welcome system, appointment no show and appointment no sale follow-up system, asking for referrals and reviews system. The management of marketing assets is done through marketing automation. Marketing automation utilizes a system to automate repetitive marketing work. The entity may automate repetitive tasks such as email marketing, social media posting, and even ad campaigns not just for the sake of efficiency, but also to provide a more personalized experience for the customers. Marketing automation helps to identify potential customers, automating the process of nurturing those leads to sales-readiness. Marketing automation is a failsafe follow up system for any client communication that covers every scenario of a service transaction.

Figure 9:
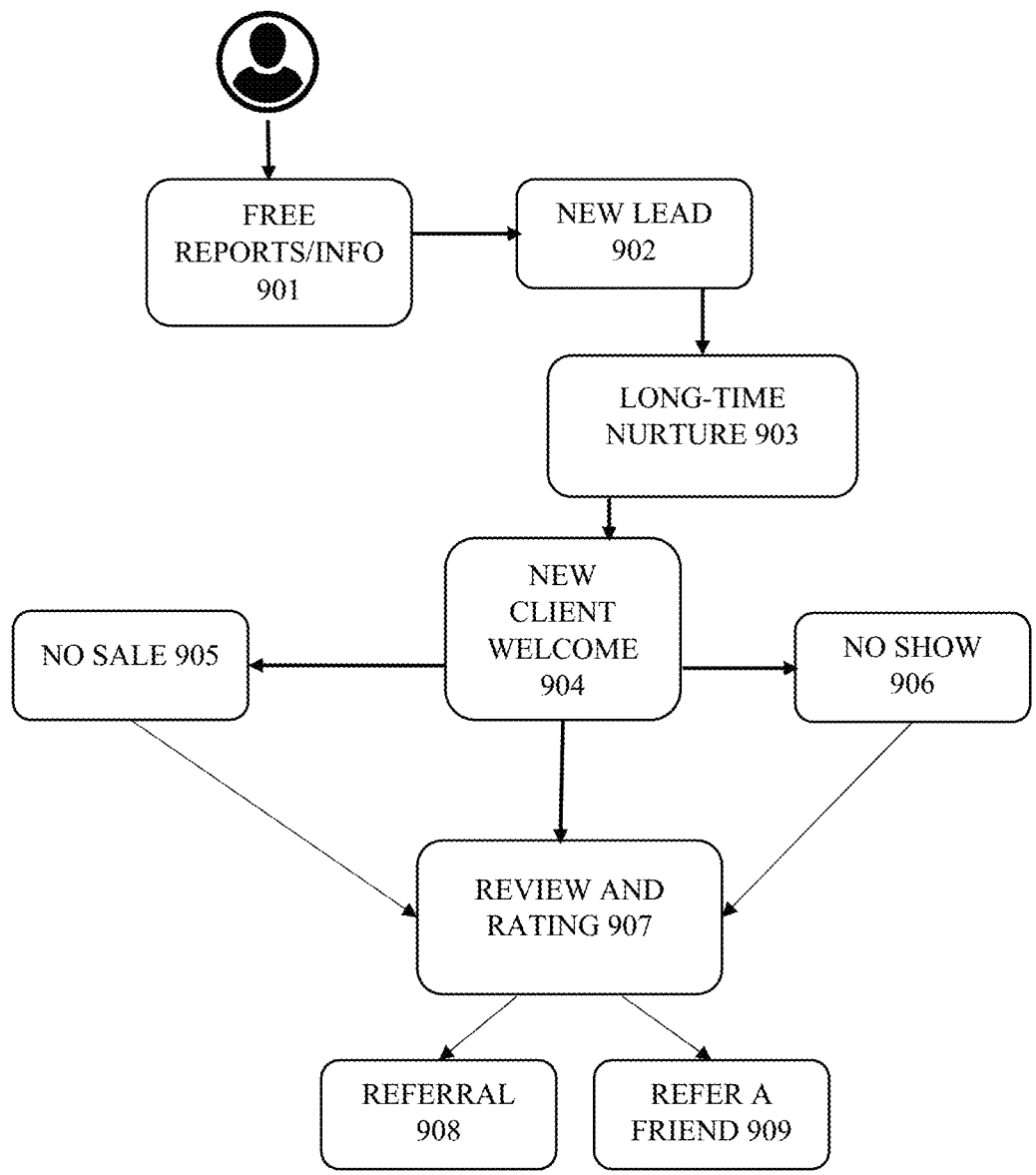
FIG. 9 shows an example flow chart of simple marketing automation assets, according to an embodiment of the invention.

The marketing automation used herein comprises simple marketing automation and complex marketing automation. There are a series of email sequences and print assets that are delivered via email and via phone and in print. So, the right message goes to the right lead at the right time, based on where the lead is in the marketing automation decision making process that is explained further. FIG. 9 shows an example flow chart of simple marketing automation assets, according to one or more embodiments. The marketing automation is done through classification model techniques using machine learning. The model learns through the performance of each parameter of the data and takes the corrective action to automate the marketing process. The system learns through the process for e.g., after the initial information, a lead is automatically sent an email for long time nurture. After a confirmation of a new lead, the new lead is sent for a long time to nurture as well as the new client is welcomed to the system. Thus, the system learns through the steps mentioned further and takes appropriate action to perform marketing automation. At block 901, the initial information and help are provided by free telephonic consultation to generate new leads. At block 902, a new lead is confirmed from the initial information consultation. At block 903, the new lead is then nurtured for a long-time association through a long-term nurture system. The long-time nurture system may have a series of emails sent periodically to stay connected with the lead. The lead is also sent print and digital material to stay updated about the entity and what it offers. At block 904, a new client/lead is welcomed to the system through a new client welcome system. At block 905, the appointment shows up but there is no sale, then the client is followed up for the reason for no sale and asking him for referral and reviews. At block 906 in case there is no show for the appointments set, the client is followed up for not showing up. At block 907, the reviews and ratings from the clients are recorded. At block 908 and 909, the client is asked for referrals and asked to refer the system to a friend.

Figure 10:
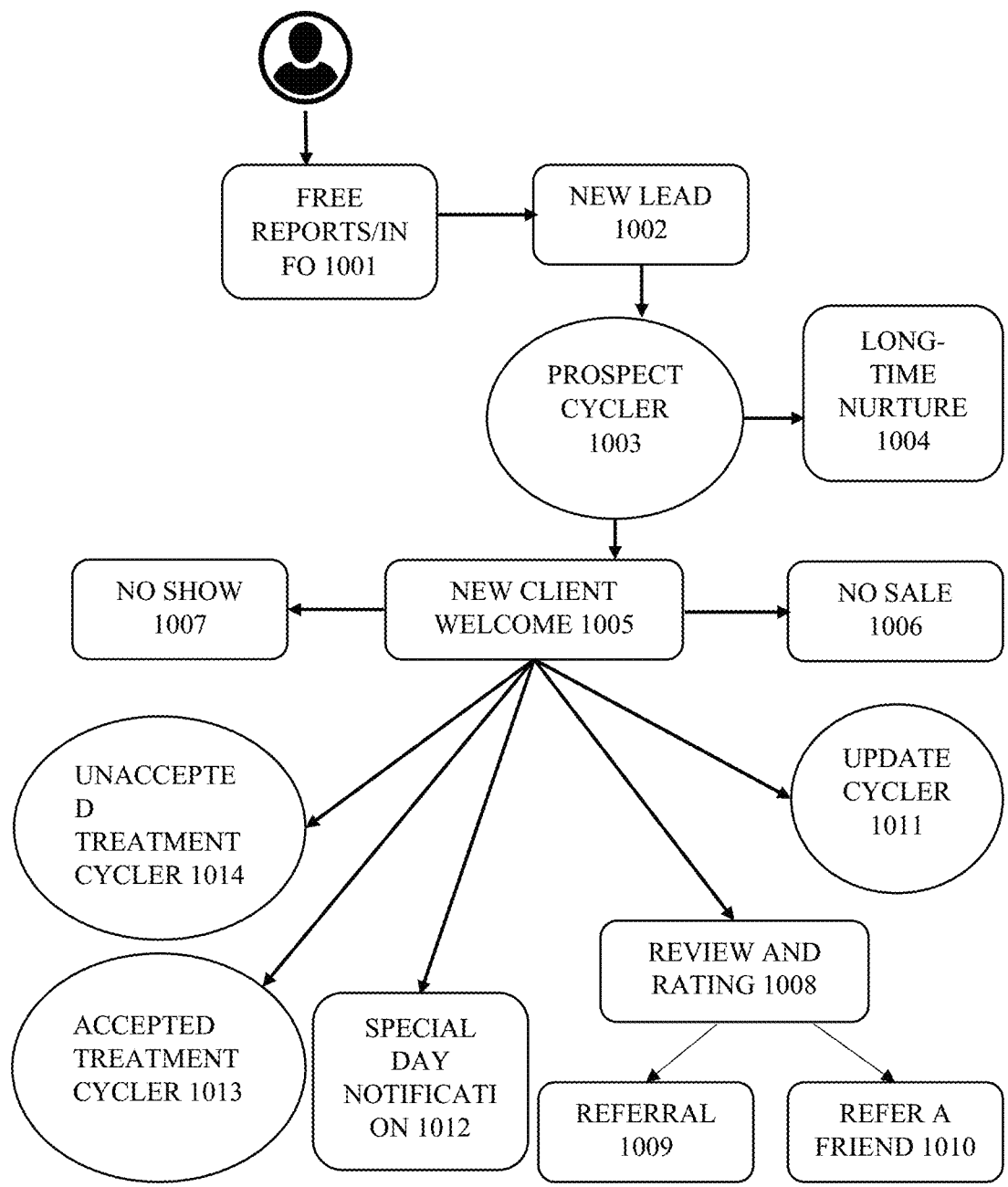
FIG. 10 shows an example of a complex marketing automation flow chart, according to an embodiment of the invention.

FIG. 10 shows an example of a complex marketing automation flow chart, according to one or more embodiments. At block 1001, the initial information and help are provided by free telephonic consultation to generate new leads. At block 1002, a new lead is confirmed from the initial information call. At block 1003, the new lead is passed through a prospect cycler. The prospect cycler is a series of marketing messages that go to a prospect or a lead who has not been presented with a treatment plan or a proposed product or a service. At block 1004, the new lead is nurtured for a long-time association through the long-term nurture system. Long term nurture material is sent to a lead that has passed through the phase of prospect cycler or a lead that has not booked an appointment after the initial information provided; wherein long term nurture is a series of marketing assets sent to the lead for a long term connection with the entity. The goal of long-term nurture is to learn more about prospects where little is known so that they can be moved into, or back into, more targeted and compelling programs. These clients or leads stay connected with the entity's products and services offered for several years via weekly email. At block 1005, a new client/lead is welcomed to the system through the new client welcome system. At block 1006, in case the appointment shows up but there is no sale, the client is followed up for the reason for no sale and asked for referral and reviews. At block 1007, in case there is no show for the appointments set, the client is followed up for not showing up for lost client reactivation. At block 1008, the reviews and ratings from the clients are recorded. At block 1009 and 1010, the client is asked for referrals and asked to refer the system to a friend. Feedback is taken by the system from the client for example, if the client is satisfied with the payment and the service, the system suggests the client to follow the entity on social media platforms for more updates on the products and services. If the client agrees to follow the entity on social media platforms, the system further asks for a referral of the entity to a friend. The system basically shares marketing material to the customers to introduce the entity to the friends. The clients are provided with brochures and material. The system may navigate the client to a web page where the client may fill the information for the referral. At block 1011, the new client is updated in an update cycler. The update cycler comprises a series of emails and print assets to keep the new lead updated. At block 1012, messages are sent to the new clients for birthdays, anniversaries, deadlines, timelines, and other special days. The system keeps track of impending dates on which a notification has to be sent to the client. For example, the system notifies for the timelines for completing an activity by the client or notifies for submitting documents. The system also notifies the important dates coming up. For example, the system sends a message or a birthday card through digital communication on the birthday of the client. At block 1013, the accepted treatment cycler is designed for leads or clients who come in for a product or service and there is a sale. The clients and leads are educated on the rules of engagement and the next steps as to what the entity wants them to do as the process to buy the product or service. At block 1014, unaccepted treatment cycler is utilized to bring the clients back for a follow-up appointment where the lead or client is presented a clinically sound but fiscally attractive alternative plan.

In an embodiment, the management of customer relationship management (CRM) setup and sales automation comprises a sales pipeline system, deal stage automation system, telephone follow up system, deal dashboard and phone dashboard reporting system. The customer relationship management and sales automation comprise opt-in emails for welcoming a new lead, a sequence of emails to follow up with the new leads, online material of sales copy assets and print assets and also delivery of physical copies of the material. The new leads are called for follow-up and qualified as a new lead or prospect.

In an embodiment, the management of print assets comprises distribution of free reports and consumer guides and Frequently asked Questions (FAQ) documents. Providing a shock and awe package is used to persuade a prospect to schedule an appointment, to show up at the scheduled appointment, and to be prepared to buy when the client shows up for the first time. Sending a box of goodies to the clients, as a thank you gift can be used to get more referrals and to generate new business. The case presentation package has the documents used in the presentation. A chair side marketing package having objection handler documents is shared with the client to answer an objection, and when the meeting (online or in person) ends, these documents are useful for getting a potential client show. Referral culture: ask and get referrals from the clients using online and offline assets.

In an embodiment, the management of pixel estate comprises online presence assets comprising managing the assets that make the presence of the entity felt online for the marketing. The online presence assets comprise brand standards and style guide, website, and microsites, blog, and blog call-to-action, landing pages and lead capture funnels, email marketing templates and digital stationary, prolific video presence and active social media channel.

In an embodiment, the management of sales copy assets comprises brand voice documents. The brand voice document identifies the uniqueness of the product that is being marketed and talks about the major benefits of the brand. A major sales argument and sales logic are identified for doing business with the entity; sales playbook: sales playbook identifies the 8 to 10 most common objections and develops best responses to deal with those objections. Sales playbook also discusses the strongest sales arguments and hits on emotional hot buttons to amplify those sales arguments. The sales playbook creates 'best answers' to most frequently asked questions so the sales process has a uniform vocabulary no matter who is doing the selling. Sales playbook may be used as a reference document for the sales team and a sales training document; the main sales letter (short form master sales presentation) is a concise document that delivers a clear, persuasive message to produce a specific sales goal. (e.g.: request demo, book meeting, attend event, request sample, book a call, come in for a free initial appointment, etc.). It creates awareness for the problem that the product/service solves, makes a business case for actually solving the problem and creates an urgency persuading the prospect to act soon; A 3D direct mail, also referred to as 3D mail, is a 3 dimensional mail, tactile mail where packages feature height, breadth, and depth. The conventional mail is a flat mailer. A 3D mail is a multi-step targeted direct mail campaign comprising marketing automation and email sequences. The 3D mail results are created from a set of merchandise that can be sent via direct mail along with a short sales letter to increase the open rate, read rate and response rate. A series of short sales letters are created bespoke to the brand and bespoke to the situation to send out a multi-step, short run direct mail every month. A three-letter-sequence may be created for situations including: new lead generation, appointment no-set (unconverted leads), appointment no-show, appointment no-sale (lost opportunities); sales testimonial booklet comprising custom crafted testimonials specifically designed to answer questions and handle objections using third party story selling method. These testimonials are taken in consideration and the existing clients/patients who are willing to say their own version of these testimonials while giving five-star reviews and referring the entity to other peers. The testimonial booklet may become a standalone sales document that may be used as a companion to a master sales presentation and web pages that sell and print asset copywriting.

In an embodiment, the management of sales copy assets comprises a master sales presentation (main sales letter), special purpose long form sales letter(s), follow up letter(s), lift letter to accompany the main letter, short form letter(s), print ad(s), lead magnet, traffic driver emails, new lead email sequence, new lead follow up sequence.

In an embodiment, the management of assets for speakers and authors comprises trade show booth lead follow up package, speaking engagement lead follow up, capture leads from stage funnel, speaker microsite, speaker print assets, book funnel.

Figure 11:
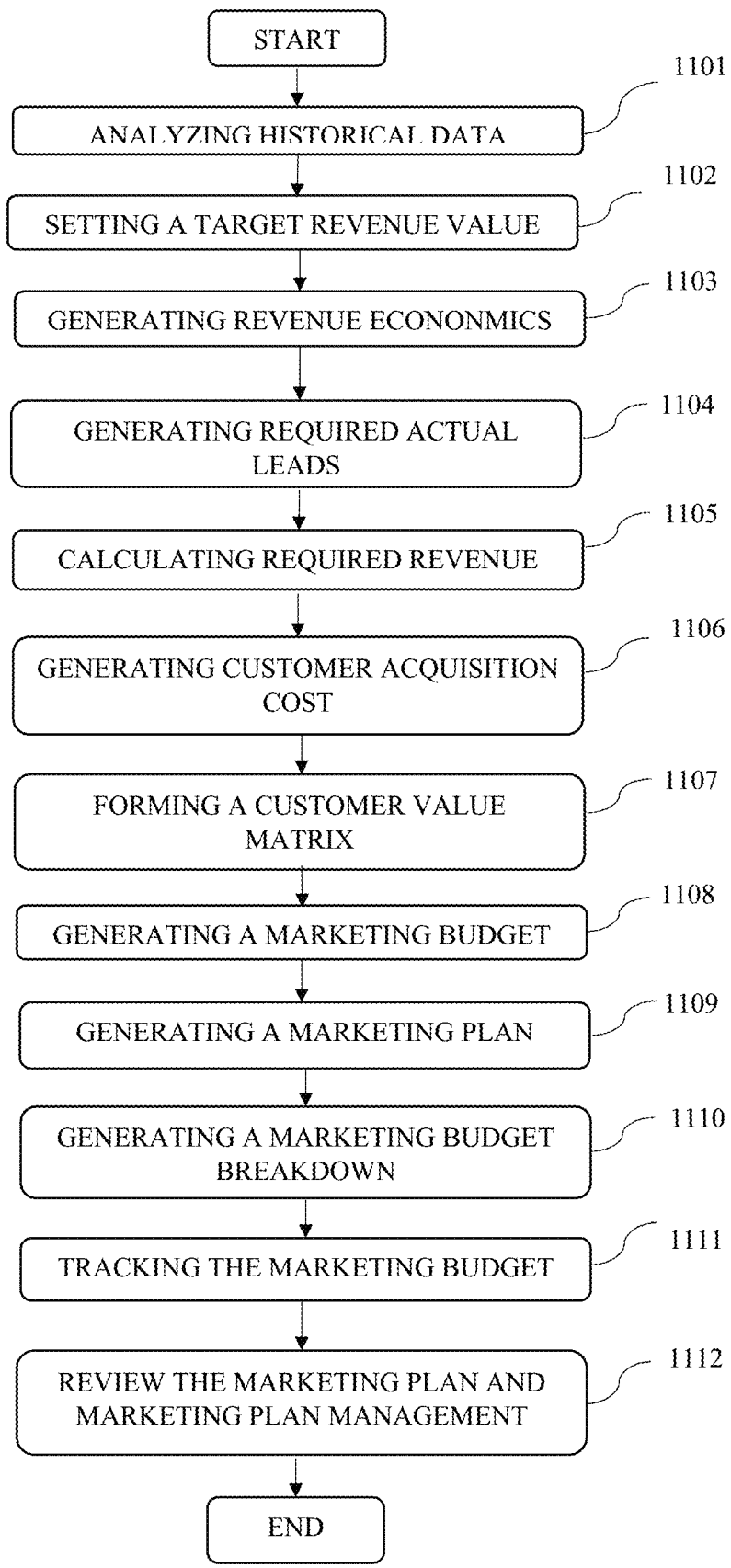
FIG. 11 illustrates a method for developing a growth strategy, according to an embodiment of the invention.

FIG. 11 illustrates a method for developing a growth strategy, according to one or more embodiments. All the steps of the method generate a growth master plan.

An embodiment relates to a method for developing a growth strategy comprising analyzing a historical data of an entity over a past period comprising a past transaction and a past revenue to develop a buyer persona or Ideal customer profile (ICP) of a customer in order to identify ideal prospects setting a target revenue goal for the entity; generating revenue economics using conversion metrics from the target revenue goal as an input; generating a marketing budget working backward from the revenue economics; and generating a marketing plan for a future period that is based on the marketing budget; wherein the method comprises conducting a Strengths, Weaknesses, Opportunities, and Threats (SWOT) analysis to take an inventory of current situation of the entity and to identify target market segments by generating the opportunities that are in alignment with the strengths of the entity; and wherein the method is for generating the marketing plan for the future period that is based on the marketing budget.

An embodiment relates to methods and systems for determining and discovering business clients matching ideal customer profiles (ICPs) for targeted advertising campaigns.

In an embodiment of the present invention it is a method for generating opt-in business leads for a business-to-business (B2B) company utilizing targeted advertising campaigns, comprising the steps of retrieving an ideal customer profile (ICP) personifying an ideal customer, the ICP comprising ICP business attribute fields and ICP persona attribute fields, where the ICP persona attribute fields identify one or more personal roles within a company identified by the ICP business attribute fields; generating candidate leads by retrieving candidate leads from one or more lead data sources, where each candidate lead matches the ICP based on a match rate signal, and where the match rate signal is calculated based on attributes of each candidate lead matching the ICP business and persona attribute fields; generating one or more test campaigns, where each test campaign is associated with a campaign cost, one or more advertising channel partners, one or more landing pages, and a group of test leads, and where the associated group of test leads is a subset of the candidate leads; directing each test campaign to the associated group of test leads, using the one or more associated channel advertising partners; receiving feedback information on each test campaign from the associated group of test leads, through the one or more associated landing pages, where each test lead who responded affirmatively to the one or more associated landing pages is marked as an acquired lead; computing a test campaign score for each test campaign, based on a number of the acquired leads acquired through the test campaign, and a campaign cost per lead (CPL); generating and directing a targeted advertising campaign to a subset of the candidate leads, wherein the targeted advertising campaign comprises one or more micro-campaigns, wherein each micro-campaign replicates a test campaign with a test campaign score exceeding a campaign score threshold, and wherein each micro-campaign is directed to a subset of the candidate leads that match a profile of the test lead group associated with the replicated test campaign; and generating the opt-in business leads by selecting candidate leads that respond affirmatively to the targeted advertising campaign.

In some embodiments of the present invention, the method further comprises the steps of serving the acquired leads to a Customer Relationship Management (CRM) system; and retrieving opportunity data on the acquired leads from the CRM, where the computing of a test campaign score for each test campaign is further based on opportunity amounts of closed opportunities for the acquired leads acquired by the test campaign.

In some embodiments, the test campaign score computed for each test campaign comprises one or more components selected from the group consisting of number of impressions, number of clicks, visit-to-form-submission conversion percentage, the campaign cost, the CPL, an opportunity amount, and a probability and a time of closing the opportunity. The visit-to-form-submission conversion percentage is computed by dividing the number of the acquired leads acquired through the test campaign by a number of test leads in the test lead group associated with the test campaign, and the CPL is computed by dividing the campaign cost associated with the test campaign by the number of the acquired leads acquired through the test campaign.

In some embodiments, the retrieved ICP is generated by: retrieving qualified leads from a Customer Relationship Management (CRM) system, where each qualified lead comprises attribute fields, where each attribute field has an attribute value, and where each qualified lead has at least one attribute field having an attribute value satisfying a qualification condition; enriching the qualified leads with enrichment data retrieved from one or more enrichment data sources to generate enriched leads, where each enriched lead comprises business attribute fields and persona attribute fields; computing a criterion attribute value score for each criterion attribute field of each enriched lead, where the criterion attribute fields are a subset of the attribute fields; computing a lead score for each enriched lead, based on the criterion attribute value scores for the enriched lead; computing a property value score for each property attribute value of each of multiple property attribute fields, based on the computed lead scores, wherein the property attribute fields are a subset of the attribute fields; and generating ICP attribute fields for the ICP, based on the computed property value scores.

In some embodiments, the computing of the weight for each attribute value of each attribute field is by generating a histogram of attribute values for each attribute field, over all enriched leads, and the generating of the ICP attribute fields for the ICP is by assigning the mode of each generated histogram to the corresponding ICP attribute field.

In some embodiments, the method further comprises the steps of obtaining primary keys for the qualified leads, obtaining secondary keys using the primary keys as keys into one or more enrichment data sources, where the secondary keys serve as primary keys for the enrichment data sources, and enriching each of the candidate lead with enrichment data retrieved from the one or more enrichment sources, where the enriching of each candidate lead comprises populating one or more attribute fields of the candidate lead with attribute values retrieved from the enrichment data sources using the secondary keys.

In some embodiments, the method further comprises the step of updating the ICP based on the acquired leads by computing a criterion attribute value score for each criterion attribute field of each enriched lead, where the criterion attribute fields are a subset of the attribute fields; computing a lead score for each enriched lead, based on the criterion attribute value scores for the enriched lead; computing a property value score for each property attribute value of each of multiple property attribute fields, based on the computed lead scores, wherein the property attribute fields are a subset of the attribute fields; and updating ICP attribute fields for the ICP, based on the computed property value scores.

In some embodiments, each of the lead data sources is selected from the group consisting of a system database, one or more third-party databases, and the one or more channel advertising partners.

An embodiment relates to a method for generating targeted advertising campaigns comprising the steps of: retrieving an ideal customer profile (ICP) comprising one or more ICP attribute fields personifying an ideal customer for the B2B company; generating candidate leads by retrieving candidate leads from one or more lead data sources, wherein each candidate lead matches the ICP based on a match rate signal, wherein the match rate signal is calculated based on attributes of each candidate lead matching the ICP attribute fields; generating one or more test campaigns, wherein each test campaign is associated with a campaign cost and an associated group of test leads, and wherein the associated group of test leads is a small subset of the candidate leads; directing each test campaign to the associated group of test leads, using one or more channel advertising partners; receiving feedback information on each test campaign from the associated group of test leads, wherein each test lead who responded affirmatively to one of the test campaigns is marked as an acquired lead; computing a test campaign score for each test campaign, based on a number of the acquired leads acquired through the test campaign, and a campaign cost per lead (CPL); and generating a targeted advertising campaign to a larger subset of the candidate leads based on the test campaign scores of the test campaigns.

Another embodiment relates to a method for generating targeted advertising campaigns, comprising the step of retrieving an ideal customer profile (ICP) comprising one or more ICP attribute fields personifying an ideal customer; generating candidate leads by retrieving candidate leads from one or more lead data sources based on the ICP attribute fields; generating one or more test campaigns, wherein each test campaign is associated with a campaign cost and an associated group of test leads, and wherein the associated group of test leads is a small subset of the candidate leads; scoring each test campaign by generating a test campaign score for each test campaign, based on a number of acquired leads acquired through the test campaign and a campaign cost per lead (CPL), wherein the numbers of acquired leads is calculated based on feedback information received from each test campaign from the associated group of test leads, and wherein each test lead who responded affirmatively to one of the test campaigns is marked as an acquired lead; and generating a targeted advertising campaign to a larger subset of the candidate leads based on the test campaign scores of the test campaigns.

In an embodiment of the present invention is a system for generating ideal and opt-in business leads utilizing targeted advertising campaigns, comprising a processor, a client-server connection to a Customer Relationship Management (CRM) system, a client-server connection to one or more lead data sources, and a non-transitory, computer-readable storage medium for storing program code. The program code encodes a leads engine, and a campaigns engine having access to one or more advertising channel partners. The program code when executed by the processor causes the processor to execute a process comprising the aforementioned steps.

In an embodiment of the method, the analyzing of the historical data comprises analyzing a recency of transaction, a frequency of transaction, a monetary value of transaction.

In an embodiment of the method, the historical data of the entity comprises a history of an internal data of the entity and the history of shopping a product by a customer.

In an embodiment of the method, identification of the ideal prospects comprises identifying potential customer segment, identifying potential market segment, identifying a particular product that the customer is interested in purchasing, identifying average quantity of a product that the customer purchases, and identifying capacity of the customer to spend on the product.

In an embodiment of the method, the SWOT analysis comprises an eight-point analysis of the strengths, the weaknesses, the opportunities, the threats, and a combination thereof.

In an embodiment of the method, the method further comprises generating a "why people buy canvas" to study and understand a customer.

In an embodiment of the method, the "why people buy canvas" comprises questionnaire comprising, a reason for the customer to make a purchase, problems faced by the customer, an existing solution, the problems in the existing solution, an outline of a potential solution, an unfair advantage to the entity, target market, payoff amount for a target market, a value statement, a goal for the entity, a market position of a product and the entity.

At step 1101, a historical data of an entity over a past period comprising a past transaction and a past revenue to develop a buyer persona of a customer in order to identify ideal prospects is analyzed. The historical data may comprise a history of an internal data of the entity and a history of shopping a product by a customer. The historical data comprises transactional data of the entity for a past period. The transactional data analysis is analyzed by running a recency of transaction, a frequency of transaction, a monetary value of transaction analysis (RFM analysis). The transactional data analysis helps identify the ideal prospects by identifying a potential customer segment that purchases products from the entity; the transactional data analysis identifies the potential market segments from which the majority of customers have purchased products, the transactional data analysis also aids in identifying a particular product that the customer is interested in purchasing, identifying average quantity of a product that a customer purchases, and identifying capacity of the customer to spend on the product. Therefore, the transactional data analysis helps in identifying an ideal prospect from the segments of the customers and the market to target the marketing plan. The transactional data analysis provides a mapping of who may buy, what the customer may buy, why the customer may buy, how the customer may buy, and at what price the customer may buy for identifying the ideal prospects from the segment of customers.

In an embodiment of the method, the analysis of the strengths, weaknesses, opportunities, and threats is done. The SWOT analysis is an eight-point strengths, weaknesses, opportunities, and threats analysis (SWOT analysis). The SWOT analysis is performed to take an inventory of a current situation of the entity and to identify target market segments by generating the opportunities that are in alignment with the strengths of the entity. Also, the SWOT analysis is performed to leverage the strengths of the entity that are in alignment with the opportunities while generating the target market segments. The SWOT analysis also identifies the weaknesses that are in alignment with the opportunities, so that the weaknesses of the entity are avoided while identifying the target market segments.

In an embodiment of the method, a customer related data is received. The customer data is utilized to generate a "why people buy canvas". The "why people buy canvas" comprises questionnaire comprising, a reason for a customer to make a purchase, problems faced by the customer, an existing solution, glitches in the existing solution, an outline of a potential solution, an unfair advantage to the entity, target market, payoff amount for a target market, a value statement, a goal for the entity, a market position of a product and the entity. The "why people buy canvas" is generated for analyzing the customer problems, and the existing solutions. The "why people buy canvas" helps in framing a potential solution in target market segments according to the value statement, the goal for the entity, the market position of the product and the entity.

In an embodiment of the method, the entity policy related data is analyzed and then utilized further to generate a marketing plan. The entity policy related data comprises purpose of the entity, current mission of the entity, core values of the entity, target market for a brand of the entity, position of the brand in a market, brand promise by the entity, strengths to leverage, strengths to develop, and sales and marketing economics.

In an embodiment of the method, generating the revenue economics comprises receiving the input comprising a current revenue of the entity, an average lifetime value of a customer, an attrition factor, and the target revenue goal of the entity to generate an output of realizable leads to reach the target revenue goal.

In an embodiment of the method, the average lifetime value of the customer and the attrition factor of the customer is generated by bifurcating market segments and considering a percentage of customers for the market segments.

In an embodiment of the method, the realizable leads required are used to generate required actual leads using conversion metrics, wherein the conversion metrics account for various uncertain factors that lead to differences between the realizable leads and the required actual leads.

In an embodiment of the method, the various uncertain factors comprise accounting in percentage of the required actual leads to get to qualified leads, accounting in percentage of qualified leads to get to appointments set, accounting in percentage of appointments set to get to actual shows for an appointment, accounting in percentage of actual shows to get to qualified shows for an appointment, and accounting in percentage of qualified shows for an appointment to get to the realizable leads.

In an embodiment of the method, a realized revenue is generated by considering the required actual leads generated multiplied by the average lifetime value of the customer.

In an embodiment of the method, a customer acquisition cost basis is generated based on a factor derived from how much money the entity may afford to spend to generate realizable leads considering profit margin and sustainability of a business of the entity.

In an embodiment of the method, the customer acquisition cost is translated to each stage from the realizable leads to a required actual lead.

In an embodiment of the method, the stage from the realizable leads to the required actual leads comprises stage to calculate a number of the required actual leads, stage to calculate a number of qualified leads, stage to calculate a number of appointments set, stage to calculate a number of actual shows for the appointment, stage to calculate a number of qualified shows for the appointment, and stage to calculate a number of the realizable leads.

In an embodiment of the method, a customer value matrix is formulated from the customer acquisition cost divided with a factor comprising any value between 1 and 10 for each stage to reach the realizable leads to a required actual lead.

At step 1102, the target revenue is set and received as an input. Also, the current revenue and the attrition factor is received as an input from the system.

At step 1103, the revenue economics is generated using a target revenue goal as the main input. The input received comprises the current revenue of the entity, an average lifetime value of a customer, the attrition factor, and the target revenue of the entity to generate an output of realizable leads to reach the target revenue goal to generate the revenue economics 441. The revenue economics comprises target revenue goal, number of realizable leads, a number of required actual leads and a customer value matrix. Wherein the average lifetime value of the customer and the attrition factor of the customer is generated by bifurcating market segments and considering a percentage of customers for the market segments. The percentage of customers in each customer segment are retrieved from the transactional data analysis. The percentage of customers in each customer segment gives the average lifetime value of a customer.

At step 1104, the realizable leads are converted into required actual leads using the conversion metrics. The conversion metrics account for various uncertain factors that lead to differences between the realizable leads and the required actual leads. The various uncertain factors may comprise accounting in percentage of the required actual leads to get to qualified leads, accounting in percentage of qualified leads to get to appointments set, accounting in percentage of the appointments set to get to actual shows for the appointment, accounting in percentage of actual shows to get to qualified shows for the appointment, and accounting in percentage of qualified shows for the appointment to get to the realizable leads. Therefore, the required actual leads converted by the conversion metrics may be greater in number than the realizable leads as there is an attrition in percentage at every stage from the realizable leads to the required actual leads. The stage from the realizable leads to the required actual leads comprises stage to calculate a number of the required actual leads, stage to calculate a number of qualified leads, stage to calculate a number of appointments set, stage to calculate a number of actual shows for an appointment, stage to calculate a number of qualified shows for an appointment, and stage to calculate a number of the realizable leads.

At step 1105, on the generation of the required actual leads, a required revenue is calculated. The required revenue is calculated by considering the required actual leads generated multiplied by the average lifetime value of the customer.

At step 1106, after the generation of the required actual leads to reach the target revenue goal, a customer acquisition cost is generated. The customer acquisition cost is the cost to acquire new customers. Therefore, the customer acquisition cost is the cost of acquiring the customers according to the required actual leads generated. The customer acquisition cost is generated by dividing the realized revenue growth by the number of leads at each stage. The customer acquisition cost is generated based on a factor derived from how much money the entity may afford to spend to generate realizable leads considering profit margin and sustainability of a business of the entity. On generation of the customer acquisition cost, a ratio of the customer acquisition cost to average lifetime value of the customer is generated. The customer acquisition cost is then translated to each stage from the realizable leads to the required actual leads. That is, the customer acquisition cost is translated into: cost of acquiring one required actual lead, cost of acquiring one qualified lead, cost of acquiring one appointment set, cost of acquiring one actual show for an appointment, cost of acquiring one qualified show for an appointment, and cost of acquiring one realizable lead.

At step 1107, the translated customer acquisition cost is further utilized to formulate a customer value matrix. The customer value matrix is formulated from the customer acquisition cost divided with a factor comprising any value between 1 and 10 for each stage to reach the realizable leads to a required actual lead. The cost at each stage from the realizable leads to a required actual lead formulates the customer value matrix. The cost of acquiring one required actual lead, the cost of acquiring one qualified lead, the cost of acquiring one appointment set, the cost of acquiring one actual show for an appointment, the cost of acquiring one qualified show for an appointment, and the cost of acquiring one realizable lead is divided with the factor comprising any value between 1 and 10 formulates the customer value matrix. These revenue economics generated are further utilized to generate a marketing budget and a marketing plan.

In an embodiment of the method, the marketing budget is predicted automatically from a ratio of the customer acquisition cost to an average lifetime value of a customer.

At step 1108, the marketing budget is generated automatically by selecting a value from the customer value matrix by considering the factor derived from how much money the entity may afford to spend to generate realizable leads considering profit margin and sustainability of a business of the entity. The marketing budget is generated automatically by working backwards from the revenue economics. The working backwards from the revenue economics comprises generating the required actual leads using the conversion metrics; generating the realized revenue goal; generating the customer acquisition cost; generating the ratio of the customer acquisition cost to the average lifetime value of the customer and generating the customer value matrix. The cost of acquiring one of the required actual leads from the customer value matrix is selected and is then multiplied by the required actual leads from the conversion metrics. The output of the multiplication of the required actual leads and the cost of acquiring one of the required actual leads is the marketing budget of the entity.

In an embodiment of the method, generating the marketing plan comprises a plan to execute marketing activities periodically in the future period to reach a realized revenue in a given period.

In an embodiment of the method, generating the marketing plan for the future period comprises generating the marketing activities and a timeline for the marketing activities that assist in realizable leads.

In an embodiment of the method, the marketing activities are outsourced, performed in house or a combination thereof.

In an embodiment of the method, the marketing plan is generated considering factors comprising purpose of the entity, current mission of the entity, core values of the entity, target market for a brand of the entity, position of the brand in a market, brand promise by the entity, the strengths to leverage, the strengths to develop, and sales and marketing economics.

In an embodiment of the method, the marketing plan comprises a marketing asset acquisition and a marketing asset management.

In an embodiment of the method, the marketing asset management comprises management of technology infrastructure assets, management of corporate and personal brand assets, management of marketing automation assets, management of customer relationship management system setup and sales automation, management of print assets, management of online presence assets, management of sales copy assets, management of assets for speakers and authors.

At step 1109, a marketing plan is generated automatically for the future period considering the marketing budget for marketing activities. The marketing plan is generated automatically by considering the transactional data analysis, SWOT analysis, "why people buy canvas", the entity policy related data analysis, the revenue economics, and the marketing budget. The transactional analysis identifies the ideal customers to be targeted based upon the analysis for the marketing plan, the SWOT analysis, the opportunities that are in alignment with the strengths of the entity utilized during the marketing. Also, the weaknesses in alignment with the opportunities identified by the SWOT analysis are avoided during generating the marketing plan. While generating the marketing plan, the "why people buy canvas" is considered to understand the problems and the existing solutions of the products and services. Thus, while generating the marketing plan, marketing activities are decided to overcome the existing problems and are in alignment with the core values of the entity. The entity policy analysis is also utilized to generate the marketing plan. The entity policy comprises the purpose of the entity, current mission of the entity, core values of the entity, target market for a brand of the entity, position of the brand in a market, brand promise by the entity, the strengths to leverage, the strengths to develop, and sales and marketing economics. Therefore, the marketing plan does not conflict with the entity policy. The target revenue goal generated by the revenue economics is considered while generating the marketing plan, so the marketing plan is generated such that the revenue generated reaches the target revenue goal. Also, the marketing budget is taken into consideration while generating the marketing plan.

In an embodiment of the method, the marketing plan comprises generating the marketing activities automatically and a timeline for the marketing activities that assist in reaching the realizable leads. The marketing activities may comprise advertising, selling, and delivering products to consumers or other businesses. Some marketing activities may be done by affiliates on behalf of a company. The marketing plan comprises a plan to execute marketing activities periodically in a future period to reach a realized revenue in a given period. The marketing activities are planned in a periodic manner.

In an embodiment of the method, the marketing plan comprises a marketing asset acquisition and a marketing asset management. The marketing asset management comprises management of technology infrastructure assets, management of corporate and personal brand assets, management of marketing automation assets, management of customer relationship management system setup and sales automation, management of print assets, management of online presence assets, management of sales copy assets, management of assets for speakers and authors.

In an embodiment of the method, the marketing plan further comprises allocation of marketing budget to the marketing activities by generating a marketing budget breakdown.

In an embodiment of the method, the method further comprises generating the marketing budget breakdown comprising allocation of money from the marketing budget to each of the marketing activities according to the marketing plan.

In an embodiment of the method, generating the budget breakdown comprises tracking a part of the marketing budget allocated and an unallocated part of the marketing budget available in cash reserves to spend on discretionary spending to pursue new unplanned opportunities and fund new or unplanned expenses without disrupting the marketing budget.

At step 1110, the marketing budget is allocated to the marketing activities by generating a marketing budget breakdown. The marketing budget breakdown comprising allocation of money from the marketing budget to each of the marketing activities according to the marketing plan. The marketing budget allocation to each marketing activity comprises allocation of the marketing budget to the internal staff costs, marketing research, external marketing, internal marketing, agent, or outsourcing costs in case the marketing plan is executed by outsourcing.

At step 1111, the marketing budget is tracked continuously. A part of the marketing budget allocated, and an unallocated part of the marketing budget is tracked for available marketing budget in the cash reserve. The marketing budget is tracked in case there is a need to spend on discretionary spending. The discretionary spending may be for pursuing new unplanned opportunities and new or unplanned expenses. The new unplanned opportunities and funding new or unplanned expenses is done without disrupting the marketing budget because of the marketing budget tracking, as it keeps a track on a part of the marketing budget allocated and an unallocated part of the marketing budget available in cash reserve.

At step 1112, the marketing plan is periodically reviewed in the marketing plan review and periodically ranked upon the performance of the marketing plan in the marketing plan ranking. The marketing plan is ranked on a scale and then a weighted score is developed. For example, the marketing plan is ranked on a scale of 1 to 5 and a weighted score is given on the scale of 1 to 10. The marketing plan is reviewed by ranking the marketing plan according to an awareness of the marketing plan, acquisition, activation of sales of a product, revenue generated, retention, brand position of the entity, need for improvement in the marketing plan and solution to improve the marketing plan. By the ranking and review of the marketing plan, the areas of the marketing plan that need improvement are identified, and the potential solutions to improve the marketing plan are suggested. The marketing plan is reviewed and ranked periodically, and changes are made to the marketing plan according to the review and ranking of the marketing plan.

In an embodiment of the method, the marketing plan is implemented and reviewed periodically based on performance.

In an embodiment of the method, the marketing plan is reviewed by ranking the marketing plan according to an awareness of the marketing plan, acquisition of the market, activation sales of a product, revenue generated, retention, brand position of the entity, need for improvement in the marketing plan and solution to improve the marketing plan.

INCORPORATION BY REFERENCE

All references, including granted patents and patent application publications, referred herein are incorporated herein by reference in their entirety.

U.S patent application number US20040186765A1 titled "Business profit improvement support system".

US patent number U.S. Pat. No. 8,504,408B2 titled "Customer analytics solution for enterprises".

US patent number U.S. Pat. No. 8,428,997B2 titled "Customer profitability and value analysis system".

US patent number U.S. Pat. No. 7,917,383B2 titled "Method and system for boosting the average revenue per user of products or services".

US patent number U.S. Ser. No. 11/023,831B2 titled "Optimizing a business model of an enterprise".

US patent number U.S. Pat. No. 9,886,700B1 titled "Methods and systems for B2B demand generation with targeted advertising campaigns and lead profile optimization based on target audience feedback".

What I claim is:

1. A method comprising:
    extracting, by a system using a data extraction technique, data comprising a historical data, a revenue data, and a customer data from one or more data sources over a past period;

accessing, by the system, the data in the data sources to build an interactive diagnostic tree automatically using an artificial intelligence and a machine learning technique and providing an analysis of revenue of an entity based on individual revenue stream; wherein the interactive diagnostic tree is displayed on a display, and the analysis of the interactive diagnostic tree assists a user to target the revenue stream for an average revenue per customer boosting and assessing marketing campaign results based on the average revenue per customer trends;

developing, an ideal customer profile (ICP) from the customer data using the artificial intelligence and the machine learning technique to personify an ideal customer wherein the ICP comprises a plurality of ICP business attribute fields and a plurality of ICP persona attribute fields comprising a customer characteristics;

identifying, by the system executing a data mining module, target market segments, and a target list of customers;

receiving an input in real-time, by the system, comprising a current revenue of the entity, an average lifetime value of the customer, an attrition factor from an output of processing and analyzing of the historical data, and a target revenue goal of the entity through an input device;

generating realizable leads to reach the target revenue goal;

generating automatically, by the system using the artificial intelligence and the machine learning technique, a required actual leads from lead data sources, wherein each of the required actual leads are matched and compared to the ICP business attribute fields and ICP persona attribute fields to generate a match rate signal;

estimating automatically, a marketing budget, by the system, working backward from the target revenue goal using a customer value matrix, wherein the customer value matrix is a customer acquisition cost divided with a factor to reach the realizable leads to required actual leads;

automatically creating a marketing plan based on the marketing budget using the artificial intelligence and the machine learning technique, wherein the marketing plan comprises marketing activities and a timeline for the marketing activities for a future period;

wherein the method comprises conducting a Strengths, Weaknesses, Opportunities, and Threats (SWOT) analysis by the system to take an inventory of current situation of the entity and to identify the target market segments that are in alignment with the strengths of the entity;

ranking the marketing plan periodically by the system using the artificial intelligence and the machine learning technique, wherein the artificial intelligence and the machine learning technique ranks the marketing plan by receiving a feedback based upon the historical data of a set of parameters over the past period and the marketing plan to provide an insight to modify the marketing plan to reach the target revenue goal in a given time period; and wherein the method is for generating automatically, a growth master plan for the future period.

2. The method of claim 1, wherein the historical data comprises at least one of a recency of transaction, a frequency of transaction, and a monetary value of transaction.

3. The method of claim 1, wherein each of the revenue stream corresponding to at least one of a sale, consumption of a product and a service offered by the entity; and wherein the interactive diagnostic tree is further configured for generating the average revenue per customer of the products and the service corresponding to each of the revenue stream.

4. The method of claim 1, wherein the processing of the customer data using a predictive analytics model of the artificial intelligence and the machine learning technique is based on business specifications and requirement analysis of the entity.

5. The method of claim 1, wherein generating the ideal customer profile further comprises analyzing, by the system the customer data using the artificial intelligence and the machine learning technique using one or more codes to generate one or more statistical techniques comprising at least one of descriptive statistics, cluster analysis, forecasting, survival analysis and logit model.

6. The method of claim 5, wherein the one or more codes are developed using a statistical package module configured for analyzing the one or more attributes related to the customer.

7. The method of claim 1, wherein the match rate signal is calculated based on a plurality of attributes of each of the required actual leads matching the ICP business and the ICP persona attribute fields.

8. The method of claim 1, wherein the customer value matrix is a customer acquisition cost to reach the realizable leads to the required actual leads.

9. The method of claim 1, wherein the marketing plan is generated using the artificial intelligence and the machine learning technique comprising a sequence of data points captured comprising a data analysis, the realizable leads, the target revenue goal, and the marketing budget;

and wherein the marketing plan is displayed on a output interface.

10. The method of claim 1, wherein the artificial intelligence and the machine learning technique sorts data in categories based on a learning from the historical data and current data to identify future business risks and the opportunities; and the artificial intelligence and the machine learning technique analyzes and weighs a relationship between several data elements to isolate each risk and potential for the entity.

11. The method of claim 4, wherein the revenue data and the customer data stored in a database are mined by the data mining module to identify characteristics of customers relevant to increasing the average revenue per customer.

12. The method of claim 11, wherein a model to increase average revenue per customer is created by the system from the characteristics using the artificial intelligence and the machine learning technique for predicting the customer's propensity to generate increased revenue; and wherein a positive response model is created by the system from the characteristics using the artificial intelligence and the machine learning technique for determining the customer's propensity to respond positively to a marketing campaign.

13. The method of claim 1, wherein the method further comprises:

analyzing the data by the system using the artificial intelligence and the machine learning techniques by a recency of transaction, a frequency of transaction, a monetary value of transaction analysis (RFM analysis); and wherein the RFM analysis analyzes the data by segmenting the customer data based on a history of sales and purchasing activity.

14. The method of claim 1, wherein the given time period to reach the target revenue goal is at least one of a year period, a two year period, a three year period and a five year period.

15. The method of claim 1, wherein the ICP comprises, a customer characteristic, wherein the customer characteristic comprises one or more of age, earnings, industry, demographics, and purchasing activity.

16. A system comprising:
a memory; and
a processor coupled with the memory, wherein the processor is operable to:
extract, using a data extraction technique, data comprising a historical data, a revenue data, and a customer data from one or more data sources over a past period;
access, the data in the data sources to build an interactive diagnostic tree automatically using an artificial intelligence and a machine learning technique and providing an analysis of revenue of an entity based on individual revenue stream; wherein the interactive diagnostic tree is displayed on a display, and the analysis of the interactive diagnostic tree assists a user to target the revenue stream for an average revenue per customer boosting and assessing marketing campaign results based on the average revenue per customer trends;
develop, an ideal customer profile (ICP) from the customer data using the artificial intelligence and the machine learning technique to personify an ideal customer wherein the ICP comprises a plurality of ICP business attribute fields and a plurality of ICP persona attribute fields comprising a customer characteristics,
identify, by executing a data mining module, target market segments, and a target list of customers;
receive, an input in real-time, by the system, comprising a current revenue of the entity, an average lifetime value of the customer, an attrition factor from an output of processing and analyzing of the historical data, and a target revenue goal of the entity through an input device;
generate, realizable leads to reach the target revenue goal;
generate automatically, using the artificial intelligence and the machine learning technique, a required actual leads from lead data sources, wherein each of the required actual leads are matched and compared to the ICP business attribute fields and ICP personal attribute fields to generate a match rate signal;
estimate automatically, a marketing budget, working backward from the target revenue goal using a customer value matrix, wherein the customer value matrix is a customer acquisition cost divided with a factor to reach the realizable leads to required actual leads;
automatically create a marketing plan based on the marketing budget using the artificial intelligence and the machine learning technique, wherein the marketing plan comprises marketing activities and a timeline for the marketing activities for a future period;
wherein the system conducts a Strengths, Weaknesses, Opportunities, and Threats (SWOT) analysis by the system to take an inventory of current situation of the entity and to identify the target market segments that are in alignment with the strengths of the entity;
rank the marketing plan periodically using the artificial intelligence and the machine learning technique, wherein the artificial intelligence and the machine learning technique ranks the marketing plan by receiving a feedback based upon the historical data of a set of parameters over the past period and the marketing plan to provide an insight to modify the marketing plan to reach the target revenue goal in a given time period; and
wherein the system is for generating automatically, a growth master plan for the future period.

17. The system of claim 16, wherein the processor is configured to generate a sequence of the interactive diagnostic trees using predictive models of the artificial intelligence and the machine learning technique.

18. The system of claim 17, wherein a gradient boosted machine is used for behavioral predictions about the customers by generating the sequence of the interactive diagnostic trees.

19. The system of claim 16, wherein the system is trained by the machine learning algorithm for ranking the marketing plan, wherein the set of parameters comprise at least one of the visits, and the views to the system, an acquisition of the customer, an activation of sales of a product, a revenue generated, a retention ration of the customer, a rating, a review, a referral to other customers by the existing customer and , improvements made in the marketing plan in the past period.

20. A non-transitory computer storage medium storing a sequence of instructions, which when executed by a processor, causes:
extracting, by a system using a data extraction technique, data comprising a historical data, a revenue data, and a customer data from one or more data sources over a past period;
accessing, by the system, the data in the data sources to build an interactive diagnostic tree automatically using an artificial intelligence and a machine learning technique and providing an analysis of revenue of an entity based on individual revenue stream; wherein the interactive diagnostic tree is displayed on a display, and the analysis of the interactive diagnostic tree assists a user to target the revenue stream for an average revenue per customer boosting and assessing marketing campaign results based on the average revenue per customer trends;
developing, an ideal customer profile (ICP) from the customer data using the artificial intelligence and the machine learning technique to personify an ideal customer wherein the ICP comprises a plurality of ICP business attribute fields and a plurality of ICP persona attribute fields comprising a customer characteristics,
identifying, by the system executing a data mining module, target market segments and a target list of customers;
receiving an input in real-time, by the system, comprising a current revenue of the entity, an average lifetime value of the customer, an attrition factor from an output of the processing and analyzing of the historical data, and a target revenue goal of the entity through an input device;
generating realizable leads to reach the target revenue goal;
generating automatically, by the system using the artificial intelligence and the machine learning technique, a required actual leads from lead data sources, wherein each of the required actual leads are matched and compared to the ICP business attribute fields and ICP persona attribute fields to generate a match rate signal;

estimating automatically, a marketing budget, by the system, working backward from the target revenue goal using a customer value matrix, wherein the customer value matrix is a customer acquisition cost divided with a factor to reach the realizable leads to required actual leads;

automatically creating a marketing plan based on the marketing budget using the artificial intelligence and the machine learning technique, wherein the marketing plan comprises marketing activities and a timeline for the marketing activities for a future period;

wherein the processor conducts a Strengths, Weaknesses, Opportunities, and Threats (SWOT) analysis by the system to take an inventory of current situation of the entity and to identify the target market segments that are in alignment with the strengths of the entity;

ranking the marketing plan periodically by the system using the artificial intelligence and the machine learning technique, wherein the artificial intelligence and the machine learning technique ranks the marketing plan by receiving a feedback based upon the historical data of a set of parameters over the past period and the marketing plan to provide an insight to modify the marketing plan to reach the target revenue goal in a given time period; and wherein the processor automatically generates, a growth master plan for the future period.

\* \* \* \* \*